(12) United States Patent
Lai et al.

(10) Patent No.: US 8,422,539 B2
(45) Date of Patent: *Apr. 16, 2013

(54) MULTI-CARRIER RECEIVER, MULTI-CARRIER TRANSMITTER AND MULTI-CARRIER TRANSCEIVER SYSTEM

(75) Inventors: Chang-Ming Lai, Chiayi (TW); Ping-Hsun Wu, Kaohsiung (TW); Jian-Yu Li, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/174,793

(22) Filed: Jul. 1, 2011

(65) Prior Publication Data

US 2012/0044976 A1 Feb. 23, 2012

Related U.S. Application Data

(63) Continuation-in-part of application No. 12/889,417, filed on Sep. 24, 2010.

(30) Foreign Application Priority Data

Aug. 19, 2010 (TW) .............................. 99127785 A
May 17, 2011 (TW) .............................. 100117226 A

(51) Int. Cl.
*H03K 9/00* (2006.01)
*H04L 25/49* (2006.01)
*H04L 27/00* (2006.01)
*H04B 1/38* (2006.01)

(52) U.S. Cl.
USPC ........... 375/219; 375/316; 375/340; 375/295; 375/297

(58) Field of Classification Search ........................ None
See application file for complete search history.

(56) References Cited

U.S. PATENT DOCUMENTS

| | | | | |
|---|---|---|---|---|
| 3,909,720 A | * | 9/1975 | Fantera | 455/505 |
| 5,576,721 A | * | 11/1996 | Hwang et al. | 343/753 |
| 5,884,143 A | * | 3/1999 | Wolkstein et al. | 455/13.4 |
| 6,032,020 A | * | 2/2000 | Cook et al. | 455/7 |
| 6,317,413 B1 | * | 11/2001 | Honkasalo | 370/209 |
| 6,529,715 B1 | * | 3/2003 | Kitko et al. | 455/103 |
| 6,563,859 B1 | | 5/2003 | Oishi et al. | |
| 6,714,760 B2 | * | 3/2004 | Robinett | 455/3.02 |
| 7,313,367 B2 | * | 12/2007 | Bialek et al. | 455/63.3 |
| 7,515,563 B2 | * | 4/2009 | Ponnekanti | 370/334 |
| 7,542,715 B1 | * | 6/2009 | Gurantz et al. | 455/3.01 |

(Continued)

*Primary Examiner* — David C. Payne
*Assistant Examiner* — Bahman Badipour
(74) *Attorney, Agent, or Firm* — Jianq Chyun IP Office

(57) ABSTRACT

A multi-carrier receiver, multi-carrier transmitter and a multi-carrier transceiver system are provided. The multi-carrier receiver includes a first processing unit, a router and a second processing unit. The first processing unit has M first processing paths, applies intensity processing on at least a RF signal for outputting sub-carrier signals. The router has M input terminals and N output terminals, where the M input terminals are respectively coupled to the M first processing paths and receive the sub-carrier signals. The router outputs the sub-carrier signals to the N output terminals and the received signal at each output terminal of the router includes the sub-carrier signal at each input terminal. The second processing unit has N second processing paths respectively coupled to the N output terminals for demodulating the sub-carrier signals and applies an analog-to-digital conversion on the demodulated signals for generating digital signals, where M and N are greater than 0.

30 Claims, 17 Drawing Sheets

U.S. PATENT DOCUMENTS

| | | |
|---|---|---|
| 7,564,910 B2 | 7/2009 | Kostic |
| 7,660,361 B2 | 2/2010 | Sakoda |
| 8,155,534 B2* | 4/2012 | Winzer .......................... 398/185 |
| 8,180,303 B2* | 5/2012 | Dupuy et al. ............... 455/114.1 |
| 2002/0177465 A1* | 11/2002 | Robinett ....................... 455/552 |
| 2004/0041632 A1* | 3/2004 | Ouacha ......................... 330/295 |
| 2004/0233836 A1 | 11/2004 | Sumasu et al. |
| 2005/0094714 A1 | 5/2005 | Robinson |
| 2006/0174282 A1* | 8/2006 | Dennison et al. ............... 725/68 |
| 2008/0013654 A1 | 1/2008 | Rick et al. |
| 2008/0016535 A1* | 1/2008 | James et al. .................... 725/63 |
| 2009/0113511 A1* | 4/2009 | Lee ............................... 725/129 |
| 2009/0212991 A1* | 8/2009 | Smith et al. ..................... 342/29 |
| 2010/0007433 A1* | 1/2010 | Jensen .......................... 333/132 |
| 2010/0109799 A1* | 5/2010 | Karlquist ...................... 333/132 |
| 2011/0140775 A1* | 6/2011 | Hong et al. ................ 330/124 R |
| 2011/0263214 A1* | 10/2011 | Robinson et al. ................ 455/88 |
| 2011/0274206 A1* | 11/2011 | Catreux et al. ................. 375/295 |
| 2011/0319107 A1* | 12/2011 | Hu et al. ........................ 455/507 |
| 2012/0057877 A1* | 3/2012 | Farmer et al. ................. 398/116 |
| 2012/0107839 A1* | 5/2012 | Lee ............................... 435/7.23 |
| 2012/0127009 A1* | 5/2012 | Pagnanelli ..................... 341/143 |
| 2012/0146742 A1* | 6/2012 | Caron et al. .................. 333/132 |

\* cited by examiner

US 8,422,539 B2

MULTI-CARRIER RECEIVER, MULTI-CARRIER TRANSMITTER AND MULTI-CARRIER TRANSCEIVER SYSTEM

CROSS-REFERENCE TO RELATED APPLICATION

This application is a continuation-in-part application of and claims the priority benefit of a prior application Ser. No. 12/889,417, filed on Sep. 24, 2010, now pending. The prior application Ser. No. 12/889,417 claims the priority benefit of Taiwan application serial no. 99127785, filed on Aug. 19, 2010. This application also claims the priority benefit of a Taiwan application serial no. 100117226, filed on May 17, 2011. The entirety of each of the above-mentioned patent applications is hereby incorporated by reference herein and made a part of this specification.

BACKGROUND

1. Field of the Disclosure

The disclosure relates to a multi-carrier receiver, a multi-carrier transmitter and a multi-carrier transceiver system.

2. Description of Related Art

Currently, wireless broadband communication technology generally uses a carrier aggregation technique to improve a spectrum efficiency of limited frequency resources and enhance data transmission capability. In the carrier aggregation technique, data required to be transmitted is distributed to sub-carriers with relatively smaller bandwidths. Since a present spectrum distribution approach limits availability of a continuously large band, in the carrier aggregation technique, the sub-carriers can be contiguous, non-contiguous or even inter-band allocation.

In an application of the carrier aggregation technique, a radio frequency (RF) transceiver system must simultaneously transmit a plurality of signals, and a common implementation thereof is to use a plurality of RF transceivers, and suitably design a bandwidth required by each RF transceiver. FIG. 1 is a functional block diagram illustrating a conventional multi-carrier receiver 100. For simplicity of illustration, only two analog signal processing paths are schematically illustrated in FIG. 1 for processing signals of two bands and transmitting processed signals to a digital signal processor 150 for further processing. A first analog signal processing path in the multi-carrier receiver 100 receives a RF signal from an antenna, and performs signal gain processing and frequency down-conversion processing to one or a plurality of sub-carrier signals of a first band (band 1) sequentially through an amplifier 110, a mixer 120 and a local oscillator 130. After the sub-carrier signals are down-converted, a filter 142 in an analog signal processing unit 140 filters noises not belonging to a predetermined bandwidth from the sub-carrier signals, and a demodulator 144 demodulates the sub-carrier signals. Then, the demodulated sub-carrier signals are converted into digital signals by an analog-to-digital converter (ADC) 146, and the digital signals are transmitted to the digital signal processor 150 for further processing. Similarly, in a second analog signal processing path of the multi-carrier receiver 100, components such as an amplifier 160, a mixer 170, a local oscillator 180, and a filter 192, a demodulator 194 and an ADC 196 in an analog signal processing unit 190 that are symmetrical to that of the first analog signal processing path are used to process one or a plurality of sub-carrier signals of a second band (band 2) according to the same processing method as described for the first analog signal processing path, and the processed signal is transmitted to the digital signal processor 150 for further processing.

The first and the second analog signal processing paths in the multi-carrier receiver 100 all preserve the maximum bandwidth (for example, the ADCs and the filters) in hardware design. It is noted that a bandwidth requirement of the ADC is not only a sum of bandwidths of all of the sub-carriers, but frequency differences of sub-carrier frequencies are also simultaneously taken into consideration, so that the RF signals can be linearly converted into digital signals, so as to maintain signal qualities of the converted sub-carrier signals. If the frequency differences of the sub-carrier frequencies are relatively greater or in case of the inter-band distribution, channel fading of the sub-carriers are different, so that the ADC is required to have relatively greater dynamic range. However, during practical operations, the received sub-carriers may not be evenly distributed to the two analog signal processing paths, and this situation causes a waste of the hardware circuit and power consumption.

Regarding other techniques for processing multi-carrier signals, the RF signal is generally converted into the digital signal, and then digital filtering processing is performed, so as to implement a multi-carrier transceiver capable of simultaneously processing a plurality of non-contiguous sub-carriers. However, these conventional multi-carrier signal processing methods still require ADCs of high complexity and high hardware cost, and meanwhile bandwidth requirements thereof are also very high. Therefore, in a multi-carrier transceiver capable of simultaneously processing a plurality of non-contiguous sub-carriers, it is an important issue to reduce complexity and hardware cost of the overall multi-carrier transceiver system.

SUMMARY

The disclosure is directed to a multi-carrier receiver capable of simultaneously processing a plurality of non-contiguous sub-carrier signals, a multi-carrier transmitter and a multi-carrier transceiver system. Two-stage signal processing units are used to process radio frequency (RF) signals and sub-carrier signals therein, and between the two-stage signal processing units, a router is used to dynamically distribute different sub-carrier signals to independent and parallel signal processing paths, so as to reduce a bandwidth requirement, complexity and corresponding hardware cost of the signal processing paths.

An exemplary embodiment of the disclosure provides a multi-carrier receiver including a first signal processing unit, a router and a second signal processing unit. The first signal processing unit has M first signal processing paths, and performs a first signal processing to at least one radio frequency (RF) signal for outputting at least one sub-carrier signal, where M is greater than 0. The router has M input terminals and N output terminals, where the M input terminals are respectively coupled to the M first signal processing paths of the first signal processing unit for receiving the at least a sub-carrier signal, and are configured for selecting to output the at least a sub-carrier signal to the N output terminals, where the received signal at each output terminal of the router includes the sub-carrier signal at each input terminal, and N is greater than 0. The second processing unit has N second processing paths respectively coupled to the N output terminals of the router for performing a second signal processing to the at least a sub-carrier signal and outputting at least a digital signal.

An exemplary embodiment of the disclosure provides a multi-carrier transmitter including a first signal processing unit, a router and a second signal processing unit. The first signal processing unit has K first signal processing paths, and performs a first signal processing to at least a digital signal for outputting at least a sub-carrier signal, where K is greater than 0. The router has K input terminals and L output terminals, where the K input terminals are respectively coupled to the K first signal processing paths of the first signal processing unit for receiving the at least a sub-carrier signal, and are configured for selecting to output the at least a sub-carrier signal to the L output terminals, where the received signal at each output terminal of the router includes the sub-carrier signal at each input terminal, and L is greater than 0. The second signal processing unit has L second signal processing paths respectively coupled to the L output terminals of the router for performing a second signal processing to the at least a sub-carrier signal and outputting at least a RF signal.

An exemplary embodiment of the disclosure provides a multi-carrier transceiver system including a multi-carrier receiver and a multi-carrier transmitter. The multi-carrier receiver includes a first signal processing unit having M first signal processing paths, and performs a first signal processing to at least a first RF signal for outputting at least a first sub-carrier signal, where M is greater than 0. A first router has M input terminals and N output terminals, where the M input terminals are respectively coupled to the M first signal processing paths of the first signal processing unit for receiving the at least a first sub-carrier signal, and are configured for selecting to output the at least a sub-carrier signal to the N output terminals, where the received signal at each output terminal of the first router includes the sub-carrier signal at each input terminal, and N is greater than 0. A second signal processing unit has N second signal processing paths respectively coupled to the N output terminals of the first router for performing a second signal processing to the at least a first sub-carrier signal and outputting at least a first digital signal. The multi-carrier transmitter transmits at least a second sub-carrier signal.

An exemplary embodiment of the disclosure provides a multi-carrier receiver including a first signal processing unit, a routed switch and a second signal processing unit. The first signal processing unit has M first signal processing paths, and performs a first signal processing to at least a RF signal for outputting at least a sub-carrier signal, where M is greater than 0. The routed switch has M input terminals and N output terminals, where the M input terminals are respectively coupled to the M first signal processing paths of the first signal processing unit for receiving the at least a sub-carrier signal. The routed switch selects to connect each input terminal to at least an output terminal or none of the output terminals according to a control signal, where N is greater than 0. The second signal processing unit has N second signal processing paths respectively coupled to the N output terminals of the routed switch for performing a second signal processing to the at least a sub-carrier signal and outputting at least a digital signal.

An exemplary embodiment of the disclosure provides a multi-carrier transmitter including a first signal processing unit, a routed switch and a second signal processing unit. The first signal processing unit has K first signal processing paths, and performs a first signal processing to at least a digital signal for outputting at least a sub-carrier signal, where K is greater than 0. The routed switch has K input terminals and L output terminals, where the K input terminals are respectively coupled to the K first signal processing paths of the first signal processing unit for receiving the at least a sub-carrier signal. The routed switch selects to connect each input terminal to at least an output terminal or none of the output terminals according to a control signal, where L is greater than 0. The second signal processing unit has L second signal processing paths respectively coupled to the L output terminals of the routed switch for performing a second signal processing to the at least a sub-carrier signal and outputting at least a RF signal.

An exemplary embodiment of the disclosure provides a multi-carrier transceiver system including a multi-carrier receiver and a multi-carrier transmitter. The multi-carrier receiver includes a first signal processing unit having M first signal processing paths, and performs a first signal processing to at least a first RF signal for outputting at least a first sub-carrier signal, where M is greater than 0. A first routed switch has M input terminals and N output terminals, where the M input terminals are respectively coupled to the M first signal processing paths of the first signal processing unit for receiving the at least a first sub-carrier signal. The first routed switch selects to connect each input terminal to at least an output terminal or none of the output terminals according to a first control signal, where N is greater than 0. The second signal processing unit has N second signal processing paths respectively coupled to the N output terminals of the first routed switch for performing a second signal processing to the at least a first sub-carrier signal and outputting at least a first digital signal. The multi-carrier transmitter transmits at least a second sub-carrier signal.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 2:
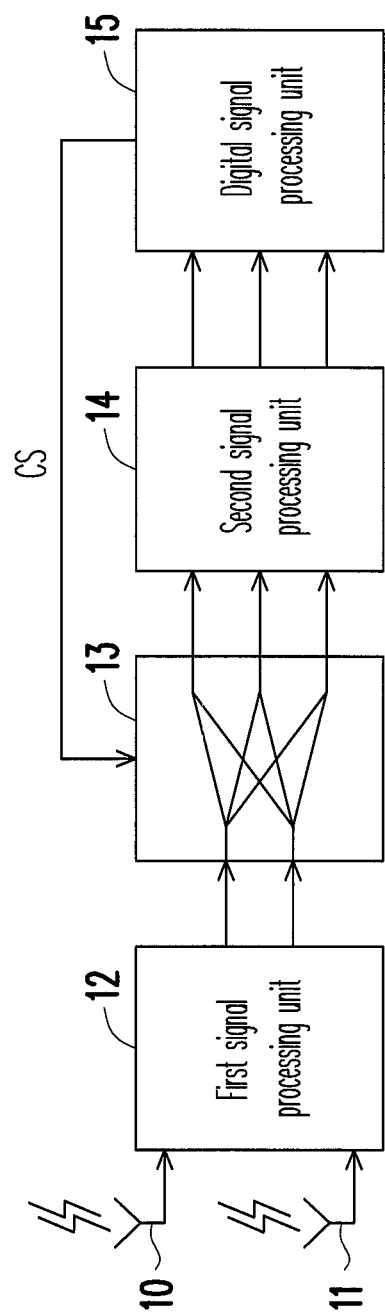
FIG. 2 is a system structural diagram illustrating a multi-carrier receiver according to a first exemplary embodiment of the disclosure.

FIG. 2 is a system structural diagram illustrating a multi-carrier receiver 200 according to a first exemplary embodiment of the disclosure. Referring to FIG. 2, the multi-carrier receiver 200 includes an antenna 10 and an antenna 11, a first signal processing unit 12, a router 13, a second signal processing unit 14 and a digital signal processing unit 15.

Referring to FIG. 2, the multi-carrier receiver 200 receives one or a plurality of radio frequency (RF) signals of two bands from the antenna 10 and the antenna 11, where the RF signal includes one or a plurality of sub-carrier signals. For example, the multi-carrier receiver 200 receives the RF signal from a transmitter, and the transmitter aggregates one or a plurality of sub-carriers or carrier components into one RF signal through a carrier aggregation technique. The RF signal can include one or a plurality of sub-carrier signals of a first band (for example, 1.8 GHz), or include one or a plurality of sub-carrier signals of a second band (for example, 2.1 GHz). Moreover, the transmitter can dynamically adjust the carrier aggregation technique for aggregating the one or a plurality of sub-carrier signals, and the sub-carriers can be non-contiguous.

For example, during a time interval, the RF signal can only include one sub-carrier signal of the first band, and simultaneously include two sub-carrier signals of the second band, while during another time interval, the RF signal can only include three sub-carrier signals (the three sub-carrier signals can be non-contiguous) of the first band, and simultaneously include none sub-carrier signal of the second band. In the present exemplary embodiment, a bandwidth of the sub-carrier or the carrier component is assumed to be 20 MHz, the RF signal aggregated according to the carrier aggregation technique is then a triple of 20 MHz, i.e. 60 MHz. However, the disclosure is not limited thereto, and the bandwidth of the sub-carrier or the carrier component can be different to 20 MHz, which can be, for example, 5 MHz, 10 MHz or 15 MHz.

The first signal processing unit 12 performs signal processing (for example, signal filtering or signal intensity processing) to the one or a plurality of the received sub-carrier signals through M parallel signal processing paths, where M is greater than 0. The router 13 is coupled to the first signal processing unit 12 and the second signal processing unit 14, and receives a control signal CS from the digital signal processing unit 15, and receives one or a plurality of the sub-carrier signals on two signal paths from the first signal processing unit 12. However, the disclosure is not limited thereto, and in other embodiments of the disclosure, the first signal processing unit 12 can further down-convert a frequency of at least one RF signal to output an intermediate frequency signal.

In the exemplary embodiment, the router 13 is a signal path switching device having M input terminals and N output terminals, where M and N are greater than 0. Referring to FIG. 2, in the multi-carrier receiver 200, M is 2 and N is 3. The router 13 can output one or a plurality of the sub-carrier signal of the M input terminals to the N output terminals, where the received signal at each output terminal of the router 13 includes the sub-carrier signal at each input terminal.

In other embodiments, the router 13 can also switch the sub-carrier signals on each signal processing path to any one of the output terminals, multiple output terminals or none of the output terminals according to the control signal CS. In other words, the router 13 connects each of the input terminals coupled to the first signal processing paths to any one of the output terminals, multiple output terminals or none of the output terminals according to the control signal CS.

The digital signal processing unit 15 can obtain information of the sub-carriers aggregated according to the carrier aggregation technique by receiving an upper-layer communication protocol signalling transmitted by a base station, and generate the control signal CS according to the information of the sub-carriers, so as to notify the router 13 to suitably switch the signal processing paths. That is, the sub-carriers on each one of the signal processing paths can be contiguous, non-contiguous or inter-band. Moreover, the sub-carriers used for transmitting data can be dynamically varied. This type of implementations will be introduced in accordance with FIG. 3A to FIG. 3C below.

Referring to FIG. 2, the second signal processing unit 14 is coupled to the router 13 and the digital signal processing unit 15. The second signal processing unit 14 receives the sub-carrier signals from the N output terminals of the router 13, and performs demodulation processing and analog-to-digital conversions to the sub-carrier signals. The second signal processing unit 14 can further perform signal filtering, signal intensity enhancement (or voltage gain) processing to the sub-carrier signals. The sub-carrier signals converted into a digital format are transmitted to the digital signal processing unit 15 for further processing.

The disclosure is not limited to the first exemplary embodiment, and in other embodiments of the disclosure, the multi-carrier receiver can only include one antenna, and the first signal processing unit 12 can receive one or a plurality of sub-carrier signals of two bands through the single antenna. Moreover, in other embodiments of the disclosure, M can be any integer different to 2 and greater than 0, and N can be any integer different to 3 and greater than 0. After the system structure of the multi-carrier receiver 200 is introduced, detailed circuit technical features of the multi-carrier receiver are introduced below with reference of FIG. 3A-FIG. 3C.

Figure 3A:
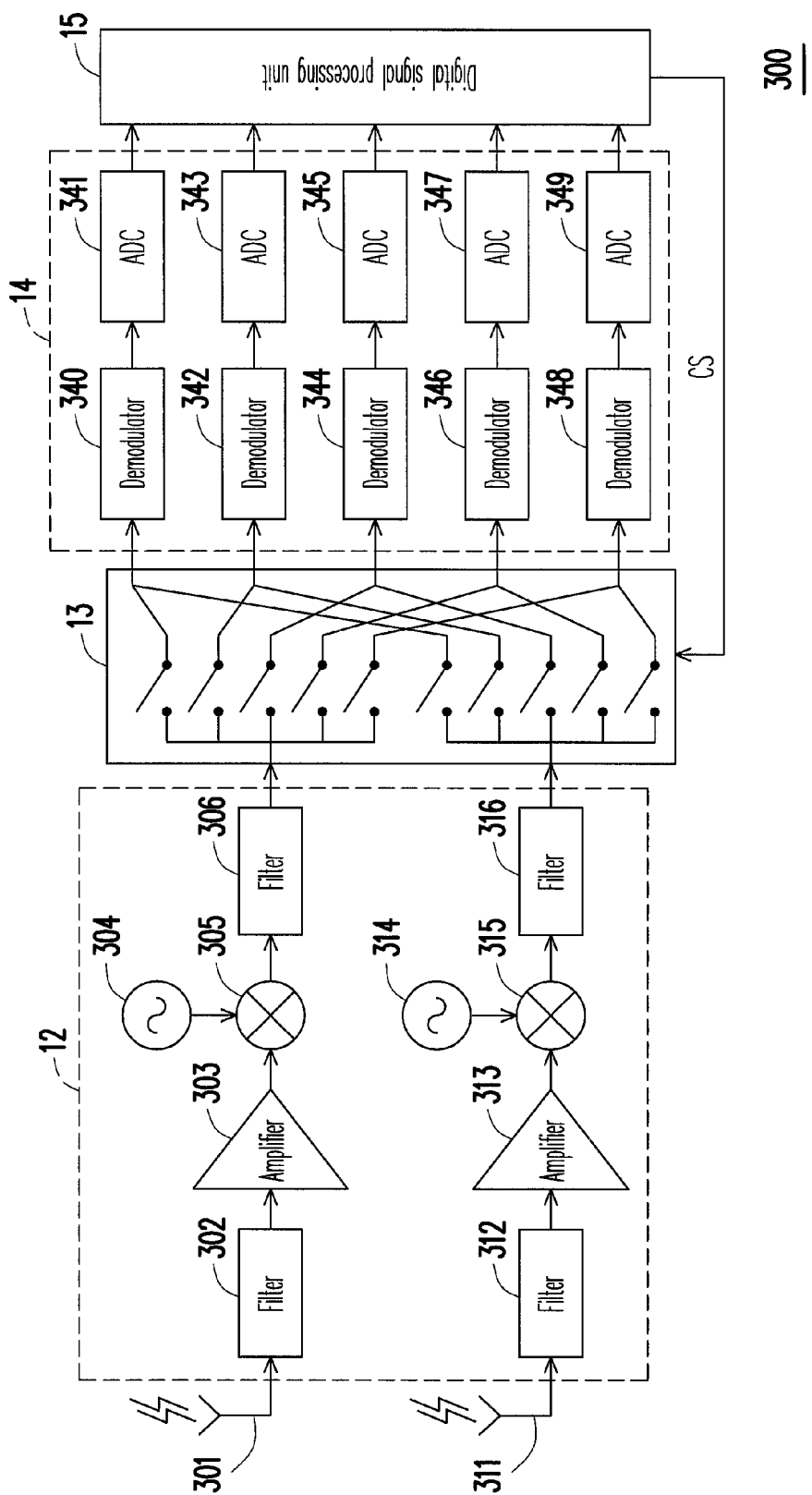
FIG. 3A is a system structural diagram illustrating a multi-carrier receiver according to a second exemplary embodiment of the disclosure.

FIG. 3A is a system structural diagram illustrating a multi-carrier receiver 300 according to a second exemplary embodiment of the disclosure. The multi-carrier receiver 300 is similar to the multi-carrier receiver 200, and the multi-carrier receiver 300 includes an antenna 301 and an antenna 311, the first signal processing unit 12, the router 13, the second signal processing unit 14 and the digital signal processing unit 15. In the second exemplary embodiment, the first signal processing unit 12 is coupled to the antenna 301 and an antenna 311 for receiving one or a plurality of RF signals of two bands, where each one of the RF signals can include one or a plurality of sub-carrier signals. Moreover, the first signal processing unit 12 can process the received one or a plurality of the sub-carrier signals through two independent and parallel signal processing paths. In detail, the first signal processing unit 12 has a first signal processing path including a filter 302, an amplifier 303, an oscillator 304, a mixer 305 and a filter 306. The filter 302 filters noises and other RF signals that are not belonging to the first band (for example, 1.8 GHz), and the amplifier 303 performs signal intensity enhancement (or voltage gain) processing to the one or a plurality of the RF signals of such band. The mixer 305 receives the enhanced RF signal and down-converts a frequency of the enhanced RF signal (which is, for example, originally in a band of 1.8 GHz) to generate an intermediate frequency signal (for example, in a band of 500 MHz) according to a frequency signal provided by the oscillator 304. The down-converted RF signal (i.e., the intermediate frequency signal) still includes one or a plurality of sub-carrier signals. The filter 306 further filters the noises of the down-converted RF signal that are not belonging to the intermediate frequency band (for example, 500 MHz), and outputs the down-converted RF signal to the router 13.

Referring to FIG. 3A, the first signal processing unit 12 further has a second signal processing path including a filter 312, an amplifier 313, an oscillator 314, a mixer 315 and a filter 316. The filter 312, the amplifier 313, the oscillator 314, the mixer 315 and the filter 316 in the second signal processing path sequentially processing the RF signals of the second band (for example, 2.1 GHz) that are received from the antenna 311 according to processing methods similar to that of the filter 302, the amplifier 303, the oscillator 304, the mixer 305 and the filter 306, so as to filter, enhance and down-convert the RF signals, and output the down-converted sub-carrier signals to the router 13.

The router 13 selects to output the sub-carrier signals of each one of the input terminals to one of the output terminals, multiple output terminals or none of the output terminals according to the control signal CS provided by the digital signal processing unit 15. Referring to FIG. 3A, in the second exemplary embodiment, the router 13 has M input terminals and N output terminals, where M is 2 and N is 5. For example, if the sub-carriers aggregated by the transmitter according to the carrier aggregation technique are all in the first band, i.e., only the RF signals in the first signal processing path have the sub-carriers, the router 13 switches the first input terminal connected to the first signal processing path to a plurality of output terminals according to the control signal CS. Since there is no sub-carrier in the second band, the router 13 does not switch the second input terminal connected to the second signal processing path to any of the output terminals according to the control signal CS.

Moreover, according to FIG. 3A, it is known that a number of the signal processing paths of the first signal processing unit 12 determines a total number of the input terminals of the router 13, and a number of signal processing paths (five signal processing paths are illustrated in FIG. 3A) of the second signal processing unit 14 determines a total number of the output terminals of the router 13. For example, if two of the sub-carriers aggregated by the transmitter according to the carrier aggregation technique are in the first band, and three other sub-carriers are in the second band, the router 13 can switch the first input terminal connected to the first signal processing path to two output terminals and switch the second input terminal connected to the second signal processing path to three output terminals according to the control signal CS.

In the second exemplary embodiment, the second signal processing unit 14 includes five parallel signal processing paths, which are respectively coupled to the output terminals of the router 13 for processing the received sub-carrier signals. A first signal processing path of the second signal processing unit 14 includes a demodulator 340 and an analog-to-digital converter (ADC) 341. The demodulator 340 demodulates the sub-carrier signal, and transmits the demodulated analog signal to the ADC 341 for converting it into a digital signal (or digital domain), and then the digital signal is transmitted to the digital signal processing unit 15 for further processing. Since the digital signal processing is not a technical main point of the disclosure, and those skilled in the art have already known the follow-up steps of the digital signal processing, a detailed operation of the digital signal processing unit 15 is not described herein.

Similar to the processing methods of the demodulator 340 and the ADC 341, the other parallel signal processing paths of the second signal processing unit 14, for example, a demodulator 342 and an ADC 343 of a second signal processing path, a demodulator 344 and an ADC 345 of a third signal processing path, a demodulator 346 and an ADC 347 of a fourth signal processing path, and a demodulator 348 and an ADC 349 of a fifth signal processing path can demodulate different sub-carrier signals, and convert the demodulated analog signals into digital signals, and transmit the digital signals to the digital processing unit 15 for further processing. Moreover, since the five parallel signal processing paths of the second signal processing unit 14 are mutually independent, the signal processing paths can perform different signal intensity enhancement processing to different sub-carrier signals, so as to balance different channel fading effects of the sub-carrier signals.

Figure 3B:
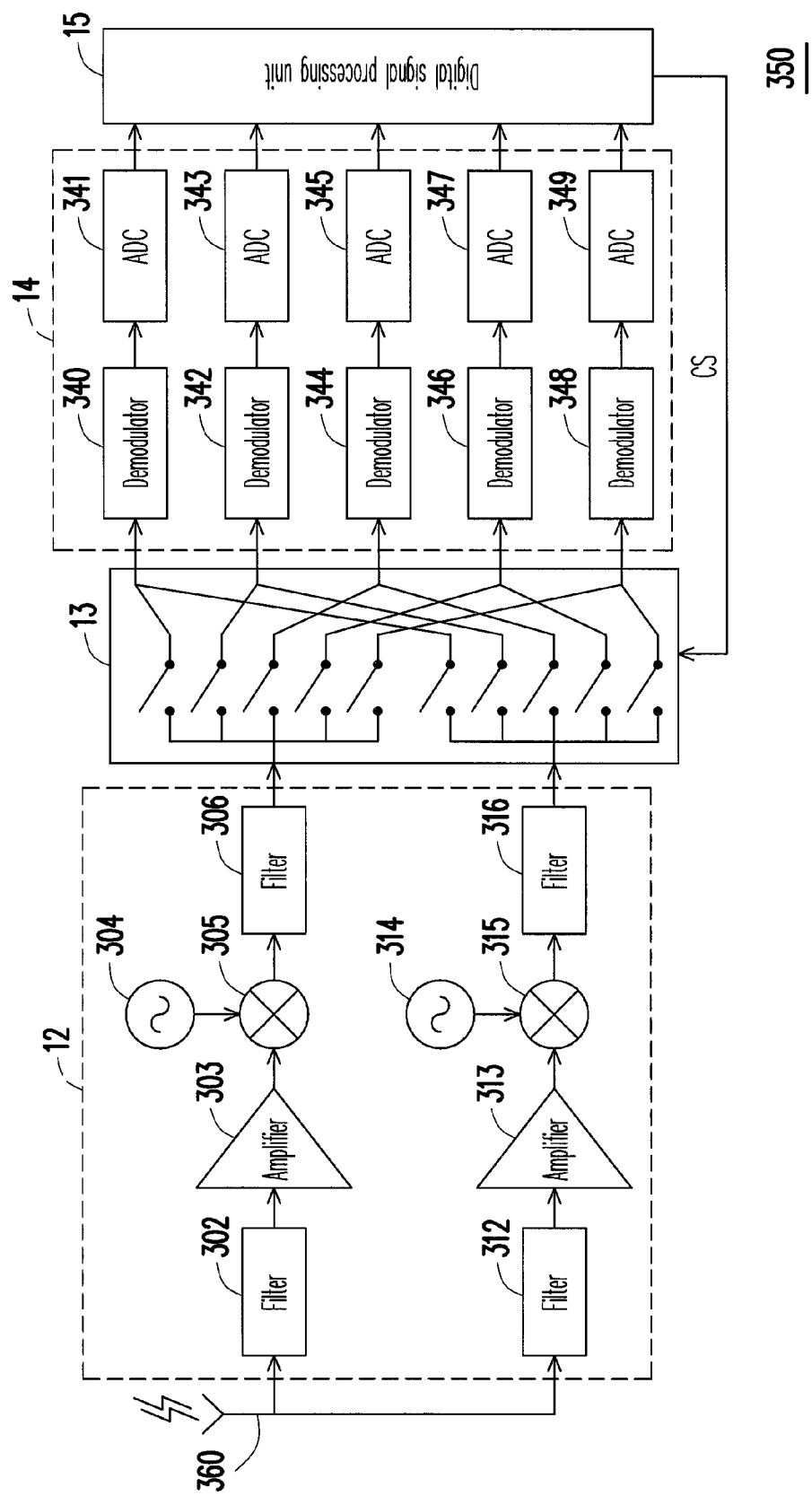
FIG. 3B is a system structural diagram illustrating a multi-carrier receiver according to a third exemplary embodiment of the disclosure.

FIG. 3B is a system structural diagram illustrating a multi-carrier receiver 350 according to a third exemplary embodiment of the disclosure. The multi-carrier receiver 350 is similar to the multi-carrier receiver 300, and a difference therebetween is that the multi-carrier receiver 350 just has one antenna 360, and the antenna 360 has a bandwidth equal to a total bandwidth of the antenna 301 and the antenna 311, so that the two parallel signal processing paths of the first signal processing unit 12 of the third exemplary embodiment are all connected to the antenna 360, and receive the RF signals of two bands from the antenna 360. However, the disclosure is not limited thereto, and in other embodiments of the disclosure, the multi-carrier receiver can receive RF signals of more than two bands from one antenna.

Figure 3C:
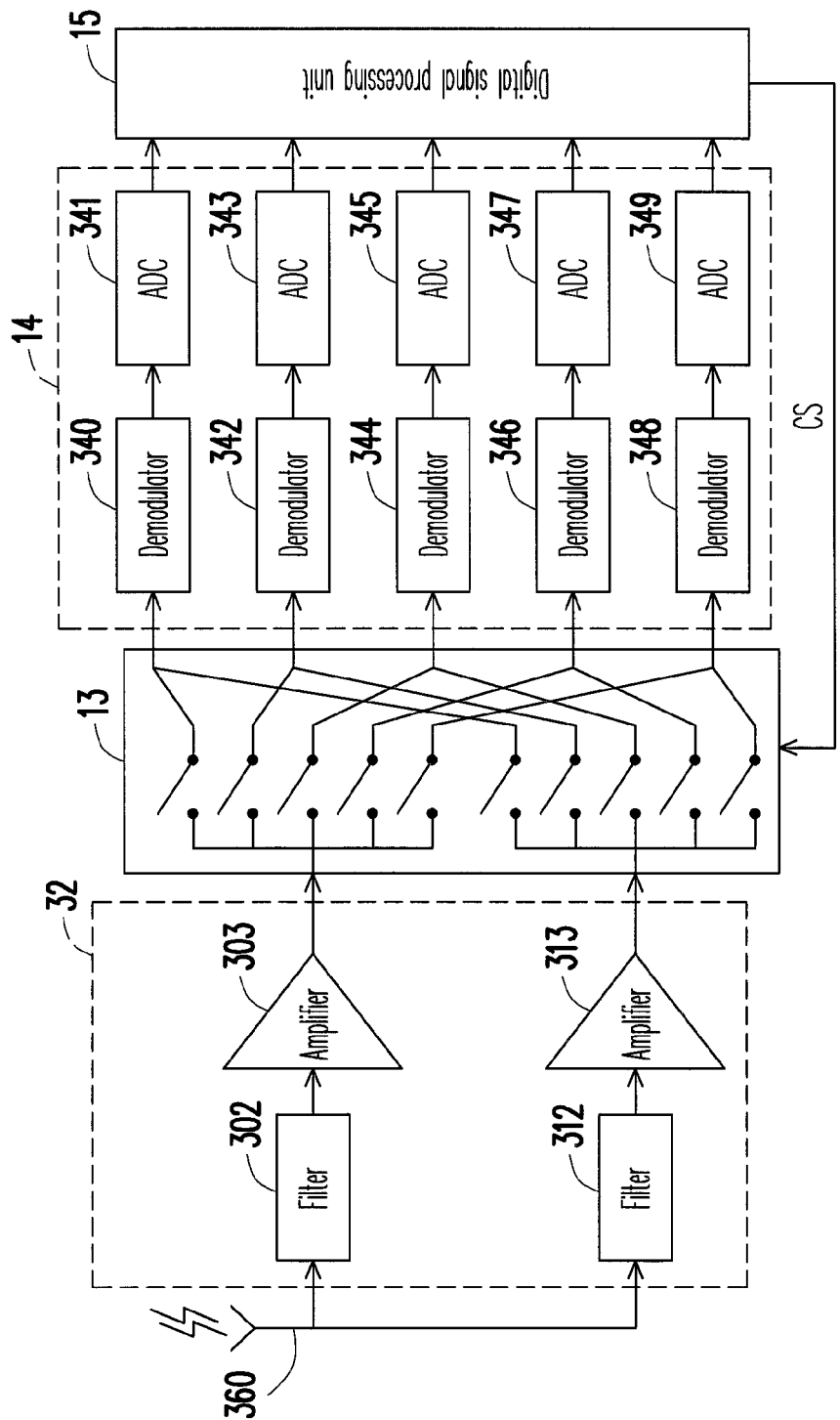
FIG. 3C is a system structural diagram illustrating a multi-carrier receiver according to a fourth exemplary embodiment of the disclosure.

FIG. 3C is a system structural diagram illustrating a multi-carrier receiver 370 according to a fourth exemplary embodiment of the disclosure. The multi-carrier receiver 370 is similar to the multi-carrier receiver 350, and a difference therebetween is that each one of first signal processing paths of a first signal processing unit 32 of the multi-carrier receiver 370 does not include the oscillator 304, the mixer 305, the filter 306, the oscillator 314, the mixer 315 and the filter 316. In other words, each one of the first signal processing paths of the first signal processing unit 32 does not use the mixer 305 and the mixer 315 to perform the down conversion processing to the at least one received RF signal. In the fourth exemplary embodiment, each demodulator (for example, the demodulator 340, 342, 344, 346 or 348) of the second signal processing unit 14 can demodulate each of the received RF signals.

To be illustrated more clearly, the routers 13 of FIG. 3A to FIG. 3C are all routed switches, and the routed switch can select to output the sub-carrier signal of each input terminal of the routed switch to one output terminal, multiple output terminals or none of the output terminals according to the control signal CS provided by the digital signal processing unit 15. After detailed components and functions of the components of the multi-carrier receiver are introduced, technical details of a multi-carrier transmitter are introduced in accordance with FIG. 4, FIG. 5A-FIG. 5C below.

Figure 4:
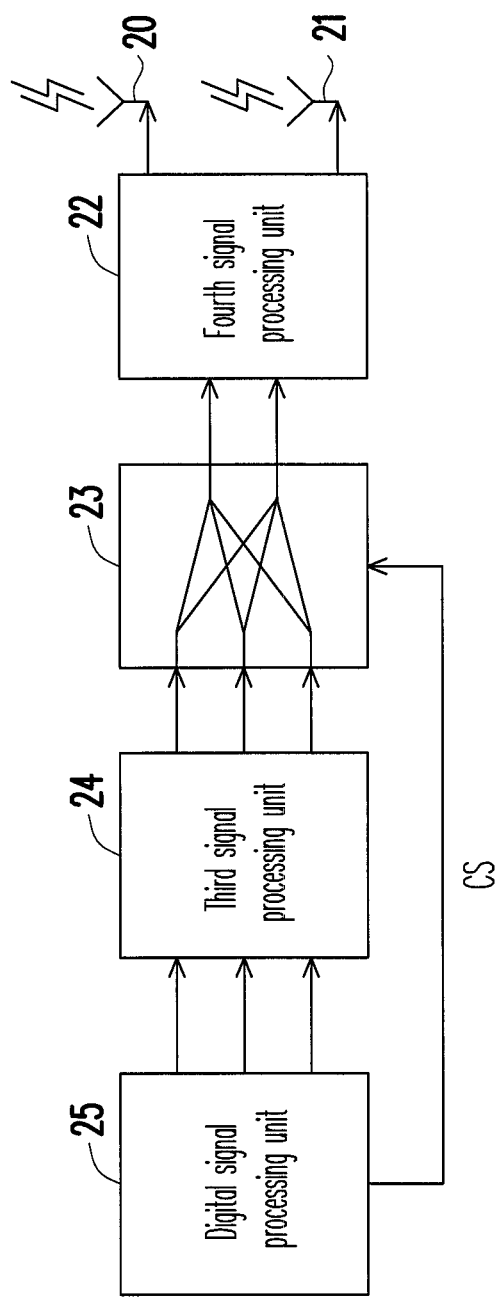
FIG. 4 is a system structural diagram illustrating a multi-carrier transmitter according to a fifth exemplary embodiment of the disclosure.

FIG. 4 is a system structural diagram illustrating a multi-carrier transmitter 400 according to a fifth exemplary embodiment of the disclosure. The multi-carrier transmitter 400 includes a digital signal processing unit 25, a third signal processing unit 24, a router 23, a fourth signal processing unit 22, an antenna 20 and an antenna 21. The digital signal processing unit 25 of the multi-carrier transmitter 400 is coupled to the third signal processing unit 24, and transmits digital signals (information of digital domain) to the third signal processing unit 24. The third signal processing unit 24 converts the digital signals into analog signals, and modulates the analog signals into sub-carrier signals.

In the present exemplary embodiment, the router 23 has K input terminals and L output terminals respectively coupled to K first signal processing paths of the third signal processing unit 24 and L second signal processing paths of the fourth signal processing unit 22 for selecting to output one or a plurality of sub-carrier signals on the K first signal processing paths to the L output terminals, where the received signal at each output terminal of the router 23 includes the sub-carrier signal at each input terminal, and K is greater than 0 and L is greater than 0.

Moreover, in other embodiments of the disclosure, the router 23 is coupled to the third signal processing unit 24 and the fourth signal processing unit 22, and switches each one of the input terminals of the router 23 to one of output terminals, multiple terminals or none of the output terminals according to the control signal CS provided by the digital signal processing unit 25. This type of implementations will be introduced in accordance with FIG. 5A to FIG. 5C below.

Through the operation of the router 23, the multi-carrier transmitter 400 can aggregate one or a plurality of sub-carriers or carrier components into one RF signal according to the carrier aggregation technique, and transmit it to any of signal processing paths of the fourth signal processing unit 22. Referring to FIG. 4, the RF signal can include one or a plurality of sub-carrier signals of a first band (for example, 1.8 GHz) and one or a plurality of sub-carrier signals of a second band (for example, 2.1 GHz). Moreover, the multi-carrier transmitter 400 can dynamically adjust the method for aggregating the one or a plurality of sub-carrier signals, and the sub-carriers can be non-contiguous. For example, during a time interval, the RF signal can only include one sub-carrier signal of the first band, and simultaneously include two sub-carrier signals of the second band, while during another time interval, the RF signal can only include three sub-carrier signals (the three sub-carrier signals can be non-contiguous) of the first band, and simultaneously include none of sub-carrier signals of the second band. In the fifth exemplary embodiment, a bandwidth of the sub-carrier or the carrier component is 20 MHz, and the RF signal aggregated according to the carrier aggregation technique is a triple of 20 MHz, i.e., 60 MHz. However, the disclosure is not limited thereto, and the bandwidth of the sub-carrier or the carrier component can be different to 20 MHz, which can be, for example, 5 MHz, 10 MHz or 15 MHz.

Referring to FIG. 4, the fourth signal processing unit 22 is coupled to the router 23 and the antenna 20 and the antenna 21 for receiving the RF signal output by the router 23. The fourth signal processing unit 22 performs filtering processing and signal intensity processing to the RF signal, and transmits it to the antenna 20 and the antenna 21 for sending to a receiver. After the system structure of the multi-carrier transmitter 400 is introduced, detailed circuit technical features of the multi-carrier transmitter are introduced below with reference of FIG. 5A-FIG. 5C.

Figure 5A:
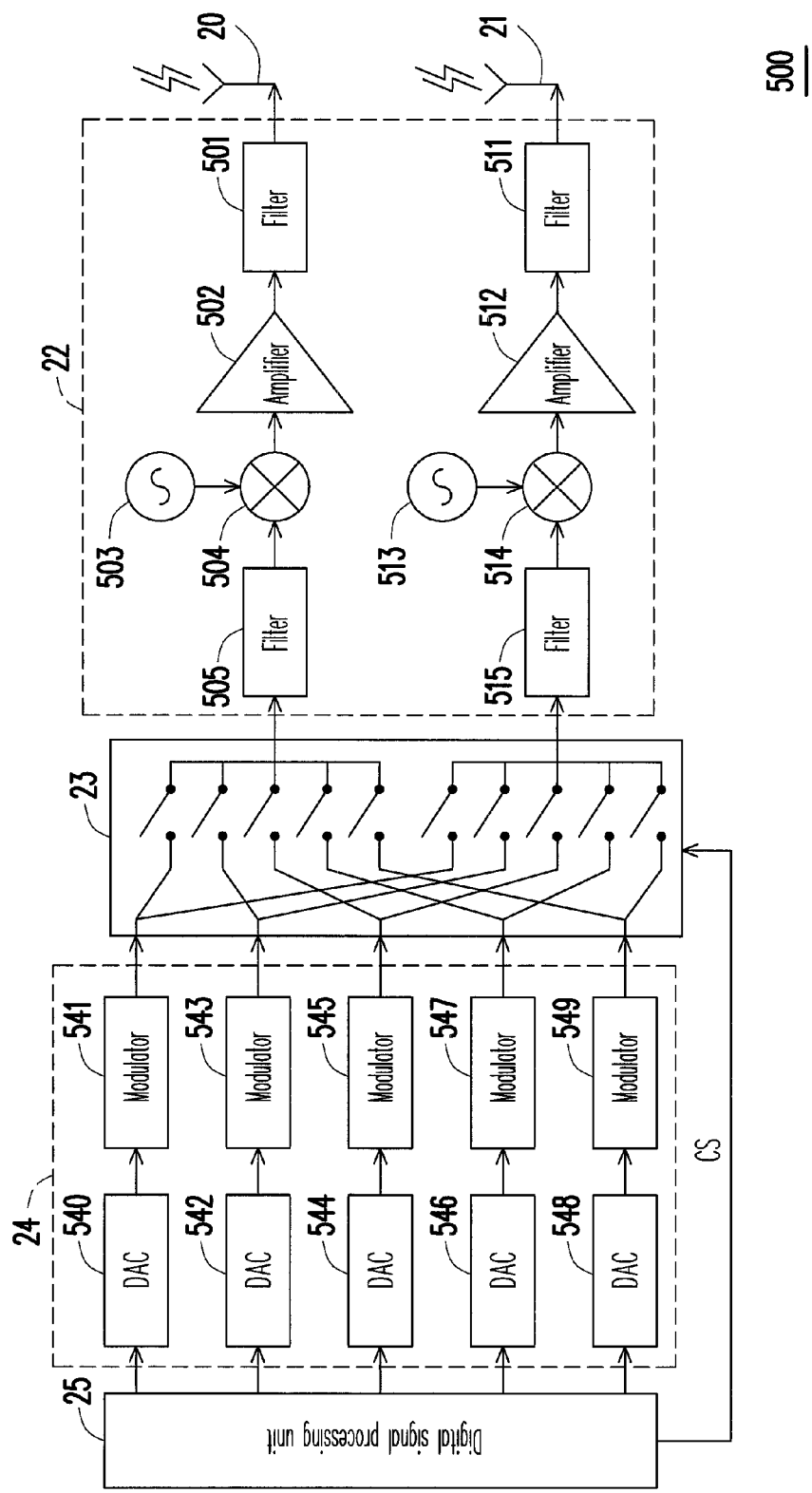
FIG. 5A is a system structural diagram illustrating a multi-carrier transmitter according to a sixth exemplary embodiment of the disclosure.

FIG. 5A is a system structural diagram illustrating a multi-carrier transmitter 500 according to a sixth exemplary embodiment of the disclosure. The multi-carrier transmitter 500 is similar to the multi-carrier transmitter 400, and the multi-carrier transmitter 500 includes the digital signal processing unit 25, the third signal processing unit 24, the router 23, the fourth signal processing unit 22, the antenna 20 and the antenna 21. The third signal processing unit 24 includes five parallel signal processing paths for respectively receiving the digital signal output from the digital signal processing unit 25, and processing the received digital signal information. A first signal processing path of the third signal processing unit 24 includes a digital-to-analog converter (DAC) 540 and a modulator 541. The DAC 540 converts the digital signal (or information of digital domain) into an analog signal, and transmits it to the modulator 541, so as to modulate the analog signal into the sub-carrier signals.

Referring to FIG. 5A, similar to the processing methods of the DAC 540 and the modulator 541, the other parallel signal processing paths of the third signal processing unit 24, for example, a DAC 542 and a modulator 543 of a second signal processing path, a DAC 544 and a modulator 545 of a third signal processing path, a DAC 546 and a modulator 547 of a fourth signal processing path, and a DAC 548 and a modulator 549 of a fifth signal processing path can convert different digital signals into analog signals, and modulate the analog signals into sub-carrier signals for outputting to the router 23 for further processing. Moreover, since the five parallel signal processing paths of the third signal processing unit 24 are mutually independent, the signal processing paths can perform different signal enhancement processing to different sub-carrier signals, so as to balance different channel fading effects probably occurred to the sub-carrier signals after the sub-carrier signals are sent by the antennas.

In the sixth exemplary embodiment, the router 23 outputs the sub-carrier signal of each one of input terminals to one of output terminals, multiple output terminals or none of the output terminals according to the control signal CS provided by the digital signal processing unit 25. Referring to FIG. 5A, in the sixth exemplary embodiment, the router 23 has K input terminals and L output terminals, where K is 5 and L is 2. For example, if the sub-carriers aggregated by the multi-carrier transmitter 500 according to the carrier aggregation technique are all in the first band, i.e., only the RF signal in a first signal processing path of the fourth signal processing unit 22 has the sub-carriers, the router 23 switches all of the input terminals to the first output terminal connected to the first signal processing path of the fourth signal processing unit 22 according to the control signal CS. Since there is no sub-carrier in the second band, the router 23 does not switch any input terminal to the second output terminal connected to a second signal processing path of the fourth signal processing unit 22 according to the control signal CS.

According to FIG. 5A, it is known that a number of the signal processing paths of the third signal processing unit 24 determines a total number of the input terminals of the router 23, and a number of the signal processing paths (two signal processing paths are illustrated in FIG. 5A) of the fourth signal processing unit 22 determines a total number of the output terminals of the router 23. For example, if two of the sub-carriers aggregated by the multi-carrier transmitter 500 according to the carrier aggregation technique are in the first band, and three other sub-carriers are in the second band, the router 23 can switch two input terminals connected to two signal processing paths of the third signal processing unit 24 to the first output terminal connected to the first signal processing path of the fourth signal processing unit 22, and switch the other three input terminals to the second output terminal connected to the second signal processing path of the fourth signal processing unit 22 according to the control signal CS.

The fourth signal processing unit 22 is coupled to the router 23, and processes the received one or a plurality of sub-carrier signals through two independent and parallel signal processing paths. In detail, the fourth signal processing unit 22 has the first signal processing path including a filter 505, an oscillator 503, a mixer 504, an amplifier 502 and a filter 501. The filter 505 filters noises and other analog signals that are not belonging to the intermediate-frequency band (for example, 500 MHz). The mixer 504 is coupled to the filter 505 and the oscillator 503 for receiving the filtered analog signal, and up-converting the filtered analog signal according to a frequency signal provided by the oscillator 503 to generate a RF signal (for example, 1.8 GHz). The frequency-increased RF signal still includes one or a plurality of sub-carrier signals. The amplifier 502 is coupled to the mixer 504 and the filter 501, and is used for performing signal intensity enhancement (or voltage gain) processing to the one or a plurality of RF signals of such band. The filter 501 further filters noises of the RF signals that are not belonging to the first band (for example, 1.8 GHz), and outputs the gained RF signals to the antenna 20 for transmitting to the receiver.

Referring to FIG. 5A, the fourth signal processing unit 22 further has the second signal processing path including a filter 515, an oscillator 513, a mixer 514, an amplifier 512 and a filter 511. The filter 515, the oscillator 513, the mixer 514, the amplifier 512 and the filter 511 in the second signal processing path sequentially process one or a plurality of sub-carrier signals received from the router 23 according to processing methods similarly to that of the filter 505, the oscillator 503, the mixer 504, the amplifier 502, and the filter 501, so as to filter, enhance and up-convert the sub-carrier signals, and output the gained RF signals to the antenna 21. Moreover, in the sixth exemplary embodiment, the fourth signal processing unit 22 is coupled to the antenna 20 and the antenna 21 for transmitting one or a plurality of the RF signals of two bands, and each RF signal can include one or a plurality of sub-carrier signals.

Figure 5B:
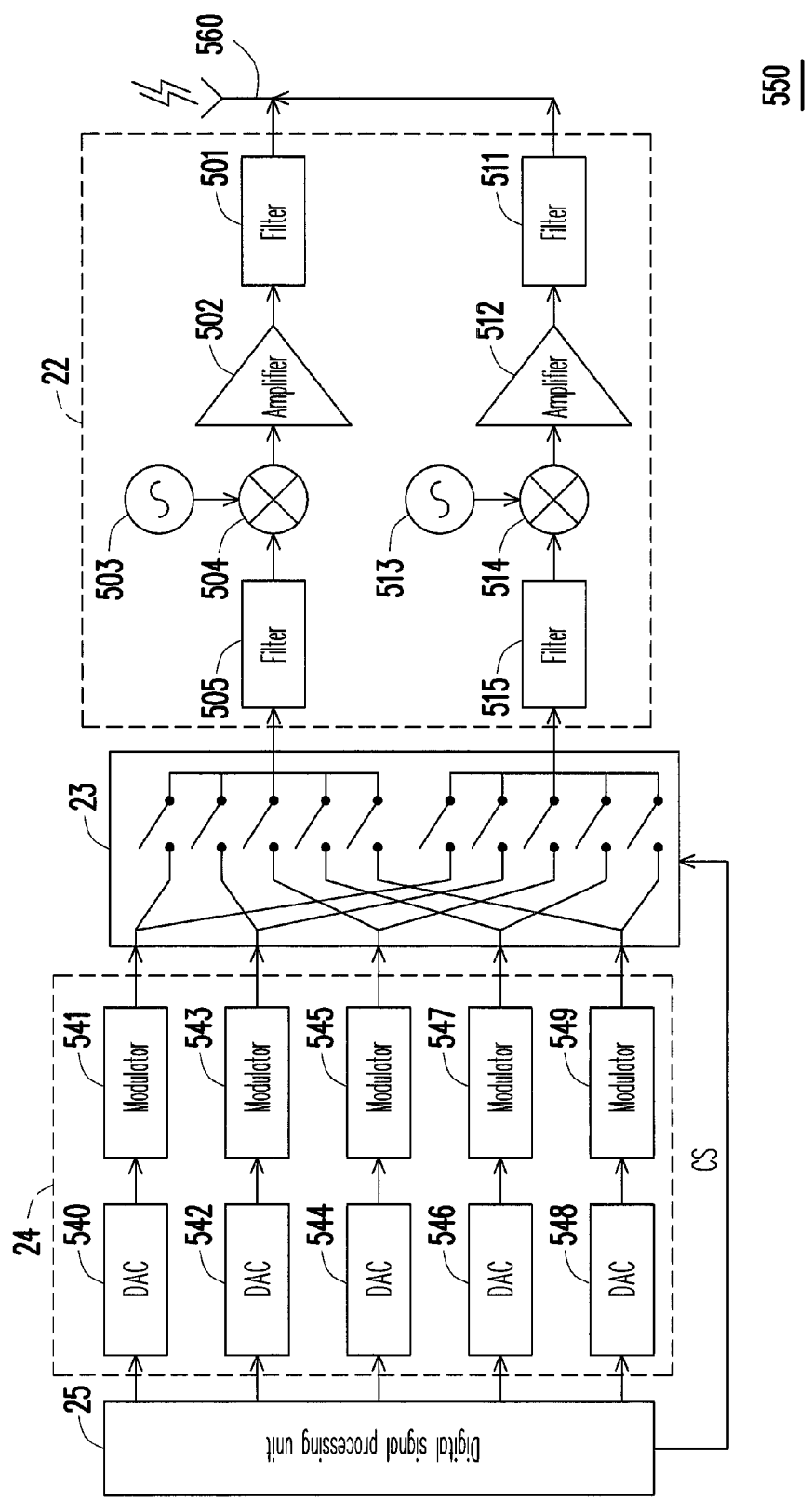
FIG. 5B is a system structural diagram illustrating a multi-carrier transmitter according to a seventh exemplary embodiment of the disclosure.

FIG. 5B is a system structural diagram illustrating a multi-carrier transmitter 550 according to a seventh exemplary embodiment of the disclosure. The multi-carrier transmitter 550 is similar to the multi-carrier transmitter 500, and a difference therebetween is that the multi-carrier transmitter 550 just has one antenna 560, and the antenna 560 has a bandwidth equal to a total bandwidth of the antenna 20 and the antenna 21, so that the two parallel signal processing paths of the fourth signal processing unit 22 of the seventh exemplary embodiment are all connected to the antenna 560, and the antenna 560 transmits the RF signals of two bands. However, the disclosure is not limited thereto, and in other exemplary embodiments of the disclosure, the multi-carrier transmitter can transmit RF signals of more than two bands through one broadband antenna.

Figure 5C:
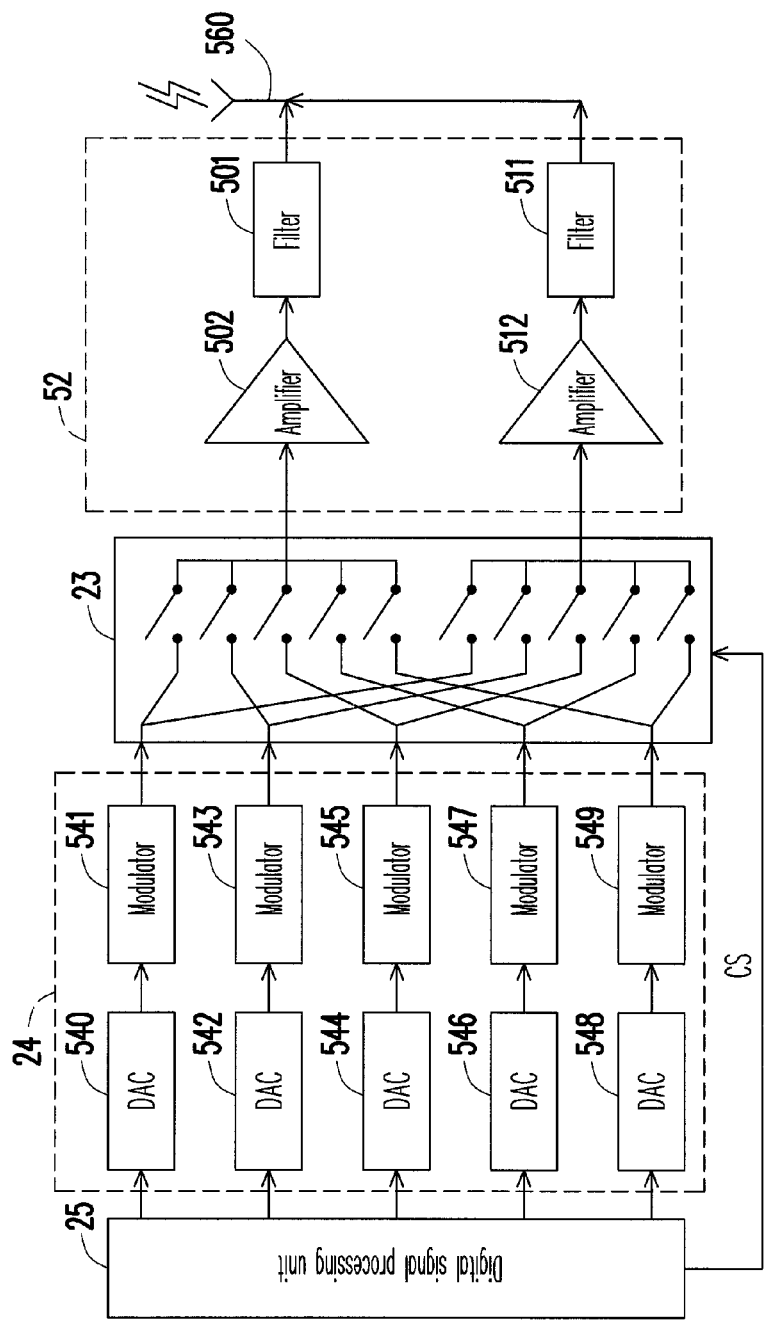
FIG. 5C is a system structural diagram illustrating a multi-carrier transmitter according to an eighth exemplary embodiment of the disclosure.

FIG. 5C is a system structural diagram illustrating a multi-carrier transmitter 570 according to an eighth exemplary embodiment of the disclosure. The multi-carrier transmitter 570 is similar to the multi-carrier transmitter 550, and a difference therebetween is that each one of the second signal processing paths of a fourth signal processing unit 52 of the multi-carrier transmitter 570 does not include the filter 505, the oscillator 503, the mixer 504, the filter 515, the oscillator 513 and the mixer 514. In other words, the fourth signal processing unit 52 of the multi-carrier transmitter 570 does not use the mixer 504 or the mixer 514 to up-convert the frequencies of the sub-carrier signals. In the eighth exemplary embodiment, each one of the modulators (for example, the modulator 541, 543, 545, 527 or 549) of the third signal processing unit 24 can modulate low-frequency analog signals to generate high-frequency sub-carrier signals.

To be illustrated more clearly, the routers 23 of FIG. 5A to FIG. 5C are all routed switches, and the routed switch can select to output the sub-carrier signal of each input terminal of the routed switch to one output terminal, multiple output terminals or none of the output terminals according to the control signal CS provided by the digital signal processing unit 15. After detailed components and functions of the components of the multi-carrier transmitter are introduced, complexity and bandwidth requirement of the multi-carrier transmitter or the multi-carrier receiver of the disclosure are compared to that of the conventional technique in accordance with FIG. 6 and FIG. 7 below.

Figure 1:
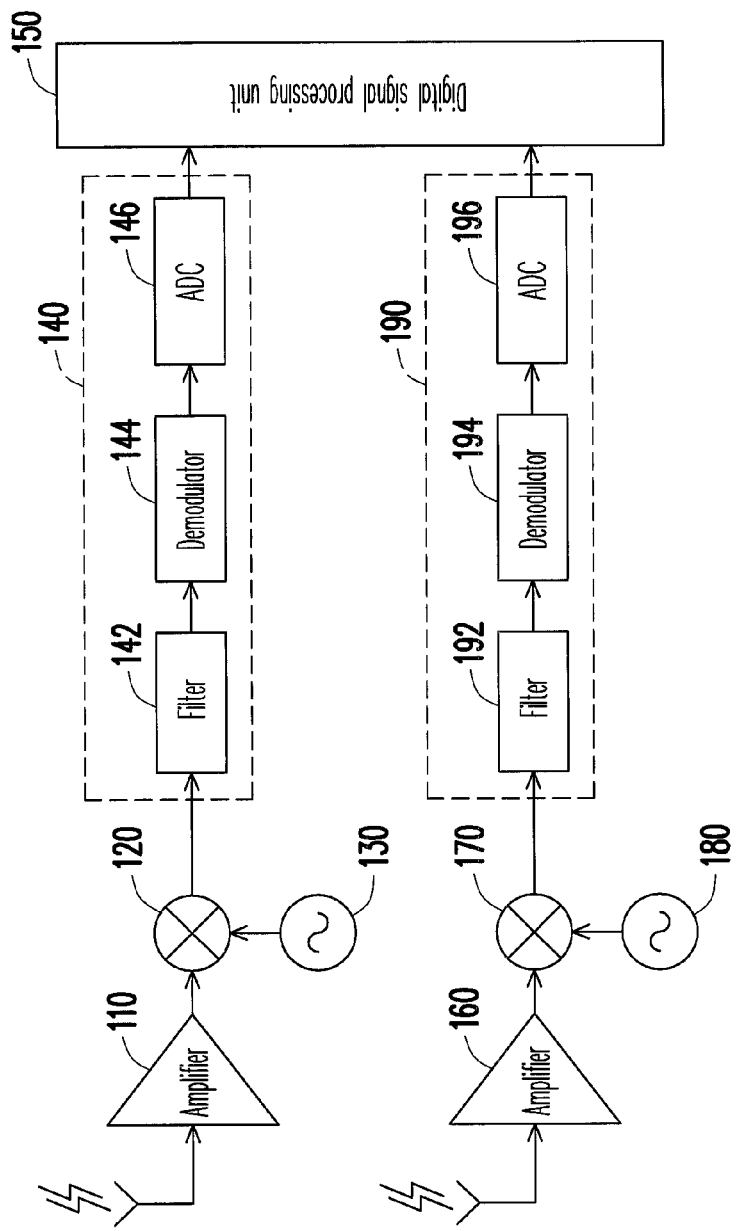
FIG. 1 is a functional block diagram illustrating a conventional multi-carrier receiver.
Figure 6:
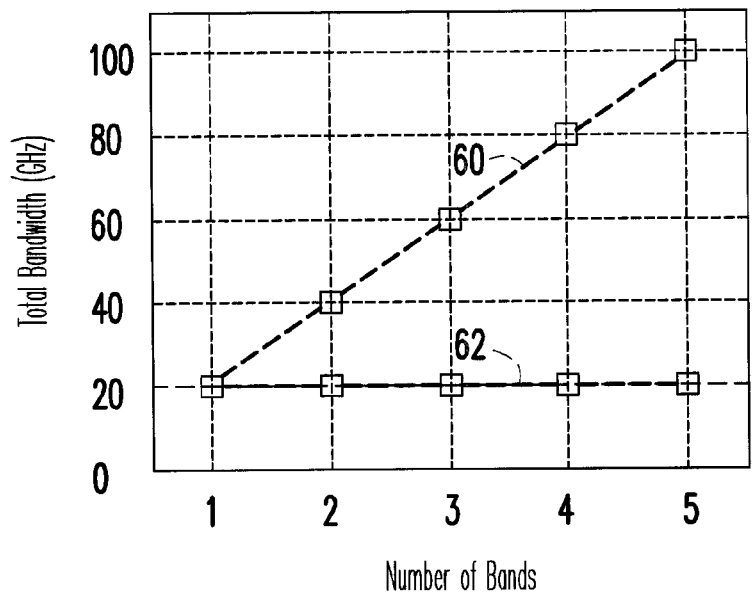
FIG. 6 is a comparison schematic diagram of total bandwidth requirements in system between the disclosure and the conventional technique.

FIG. 6 is a comparison schematic diagram of total bandwidth requirements in system between the disclosure and the conventional technique. FIG. 6 illustrates the total bandwidth requirement of the multi-carrier transmitter or the multi-carrier receiver of the disclosure when a number of the bands (i.e. a horizontal axis shown in FIG. 6) of the carrier aggregation is increased. In FIG. 6, it is assumed that a bandwidth of one band is at least 0.1 GHz, a bandwidth of each sub-carrier or each carrier component is 20 MHz, and a total number of the sub-carriers is 5. As shown in FIG. 6, a curve 60 represents that a total bandwidth of the conventional multi-carrier receiver 100 of FIG. 1 is linearly increased along with the number of the bands when the number of the bands is increased, this is because that under a most extreme condition, the multi-carrier receiver 100 has to preserve a maximum bandwidth for each one of signal processing paths, so that the total bandwidth requirement of the ADC (in the multi-carrier receiver 100) or the DAC (in the conventional multi-carrier transmitter) is also increased. Moreover, those skilled in the art should understand that the higher the bandwidth requirement of the ADC or the DAC is, the higher the hardware cost thereof is.

Comparatively, a curve 62 represents a bandwidth requirement of the multi-carrier receiver 200 provided by the first exemplary embodiment of FIG. 2. In the multi-carrier receiver 200, since the router 13 can be used to dynamically switch each one of received sub-carrier signals to a single signal processing path having the DAC, even if the number of the bands is increased, each one of the signal processing paths (the second signal processing path) only requires a maximum bandwidth (which is fixed) of the sub-carrier or the carrier component. The above-described principle is also suitable for the total bandwidth requirements of the multi-carrier receivers provided by the second and the third exemplary embodiments of the disclosure, and the multi-carrier transmitters provided by the fourth, the fifth and the sixth exemplary embodiment of the disclosure.

Figure 7:
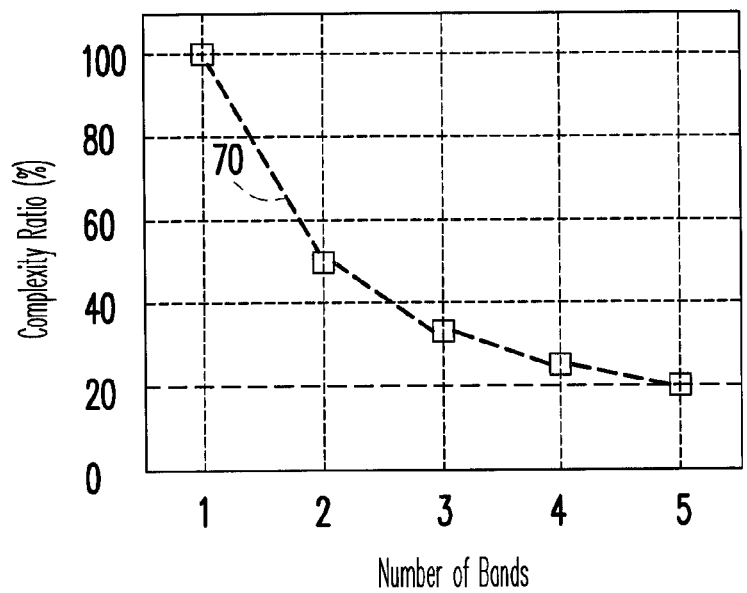
FIG. 7 is a schematic diagram illustrating a relationship between a system complexity and a number of bands of the disclosure.

FIG. 7 is a schematic diagram illustrating a relationship between the system complexity and the number of bands of the disclosure. A curve 70 in FIG. 7 represents that the complexity of the multi-carrier receiver 200 provided by the first exemplary embodiment of FIG. 2 is decreased as the number of the bands is increased. The so-called "complexity" is a ratio between a total bandwidth BW1 of the overall system of the multi-carrier receiver 200 and a total bandwidth BW2 of the overall system of the conventional multi-carrier receiver 100. The total bandwidth BW1 of the overall system of the multi-carrier receiver 200 is fixed, i.e., 0.1 GHz, but the total bandwidth BW2 of the overall system of the conventional multi-carrier receiver 100 is increased as the number of the bands is increased. For example, when the number of the bands is 5, the total bandwidth BW2 is 5×0.1 GHz=0.5 GHz. Therefore, the curve 70 presents a decreasing trend indicating that the complexity of the multi-carrier receiver 200 is decreased as the number of the bands is increased. The above principle is also suitable for the complexities of the multi-carrier receivers provided by the second and the third exemplary embodiment of the disclosure, and the multi-carrier transmitters provided by the fourth, the fifth and the sixth exemplary embodiment of the disclosure. After technical details of the multi-carrier transmitter and the multi-carrier receiver are introduced, technical details of a multi-carrier transceiver system are introduced below with reference of FIG. 8A-FIG. 8C.

Figure 8A:
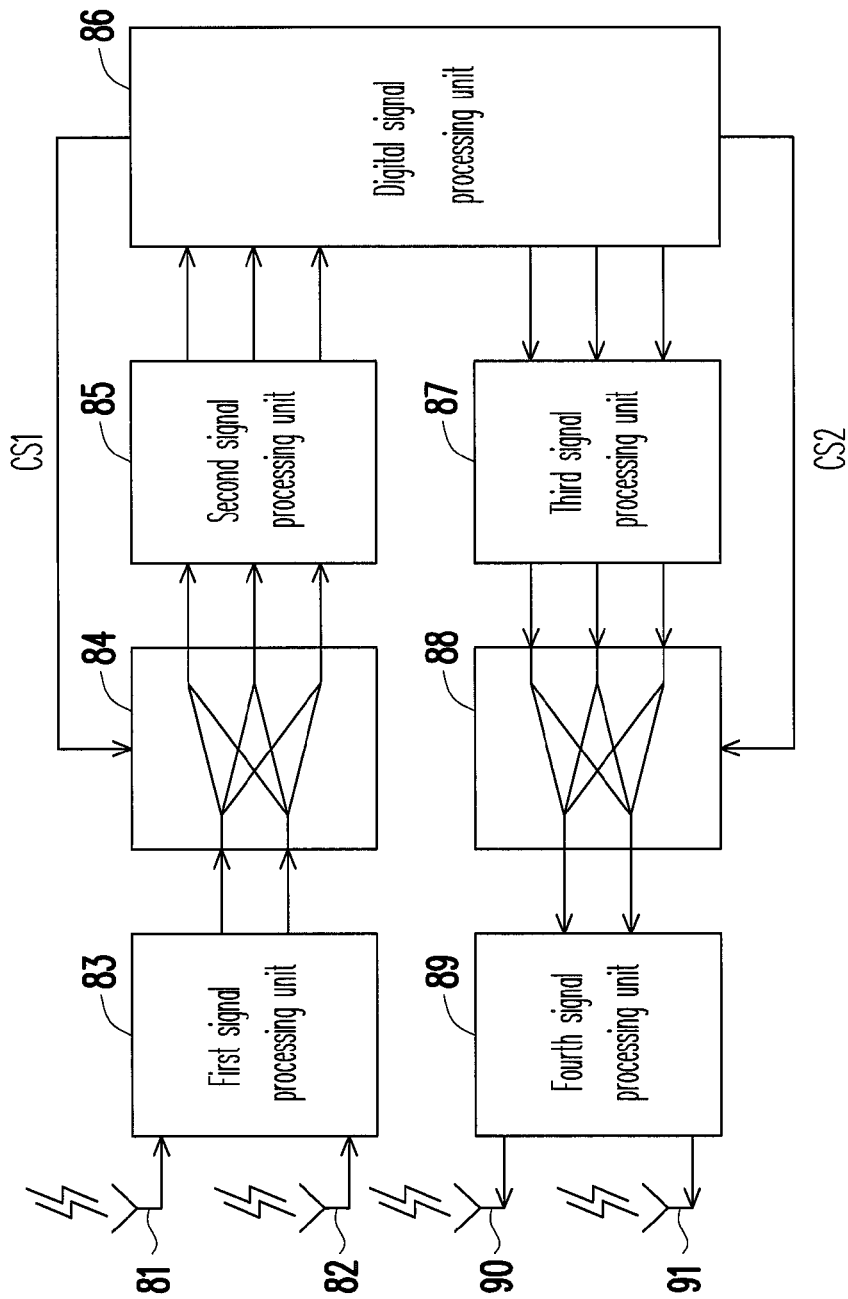
FIG. 8A is a system structural diagram illustrating a multi-carrier transceiver system according to a ninth exemplary embodiment of the disclosure.

FIG. 8A is a system structural diagram illustrating a multi-carrier transceiver system 800 according to a ninth exemplary embodiment of the disclosure. The multi-carrier transceiver system 800 includes a multi-carrier receiver and a multi-carrier transmitter. The multi-carrier receiver of the multi-carrier transceiver system 800 includes a first signal processing unit 83, a router 84, a second signal processing unit 85, a digital signal processing unit 86, an antenna 81 and an antenna 82 used for receiving RF signals. The multi-carrier transmitter of the multi-carrier transceiver system 800 includes the digital signal processing unit 86, a third signal processing unit 87, a router 88, a fourth signal processing unit 89, an antenna 90 and an antenna 91 used for transmitting RF signals.

Connection relations and operation principles of the antenna 81 and the antenna 82, the first signal processing unit 83, the router 84, the second signal processing unit 85, and the digital signal processing unit 86 of the multi-carrier transceiver system 800 are similar to that of the antenna 10 and the antenna 11, the first signal processing unit 12, the router 13, the second signal processing unit 14 and the digital signal processing unit 15 of the multi-carrier receiver 200 of the first exemplary embodiment. Similarly, Connection relations and operation principles of the digital signal processing unit 86, the third signal processing unit 87, the router 88, the fourth signal processing unit 89, the antenna 90 and the antenna 91 used for transmitting RF signals of the multi-carrier transceiver system 800 are similar to that of the digital signal processing unit 25, the third signal processing unit 24, the router 23, the fourth signal processing unit 22, the antenna 20 and the antenna 21 of the multi-carrier transmitter 400 of the fourth exemplary embodiment. Besides that the digital signal processing unit 86 respectively provides control signals CS1 and CS2 to the router 84 and the router 88, other technical details of the multi-carrier transceiver system 800 are not introduced herein.

Figure 8B:
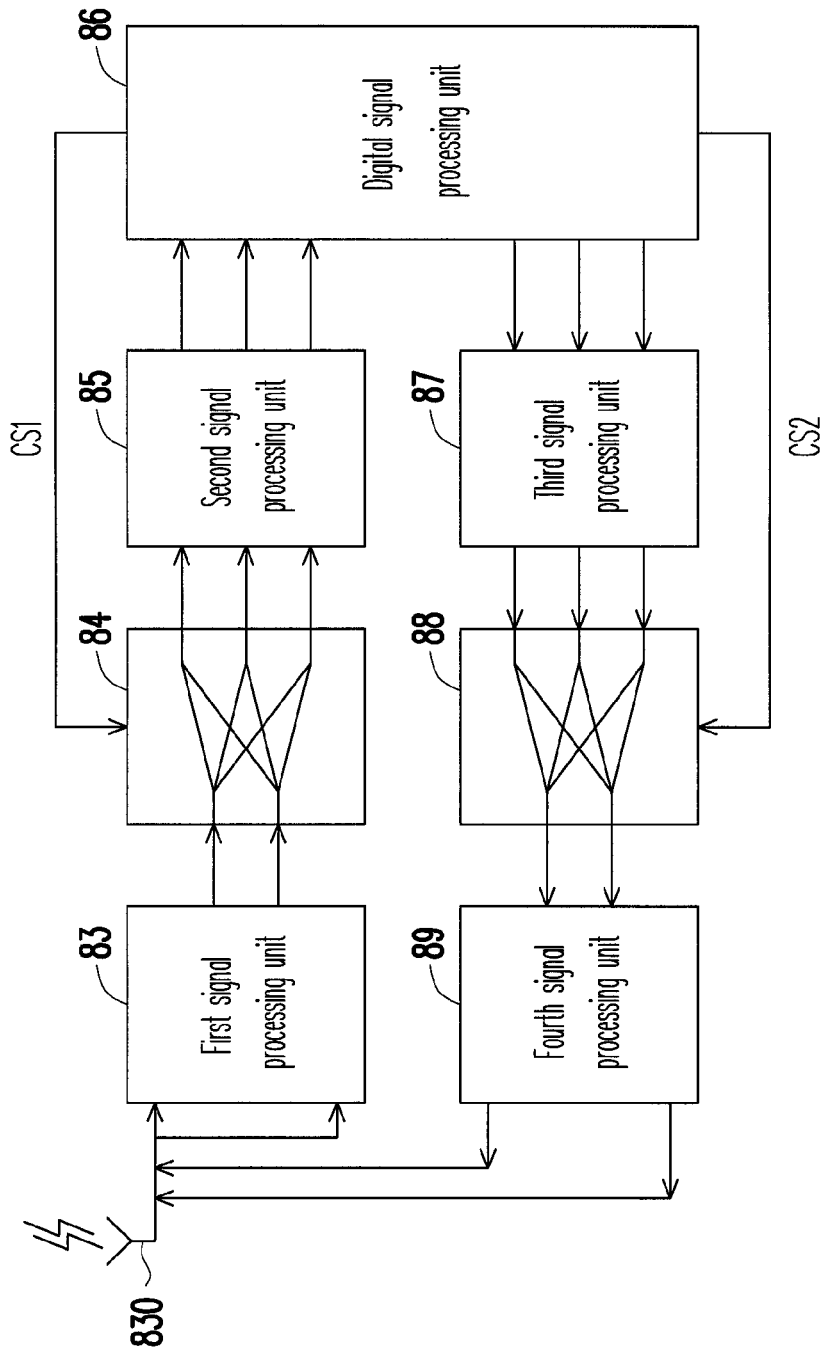
FIG. 8B is a system structural diagram illustrating a multi-carrier transceiver system according to a tenth exemplary embodiment of the disclosure.

FIG. 8B is a system structural diagram illustrating a multi-carrier transceiver system 820 according to a tenth exemplary embodiment of the disclosure. The multi-carrier transceiver system 820 is similar to the multi-carrier transceiver system 800, and a difference therebetween is that the multi-carrier transceiver system 820 just has one antenna 830 for receiving and transmitting RF signals, and the antenna 830 has a bandwidth equal to a total bandwidth of the antenna 81, the antenna 82, the antenna 90 and the antenna 91.

Figure 8C:
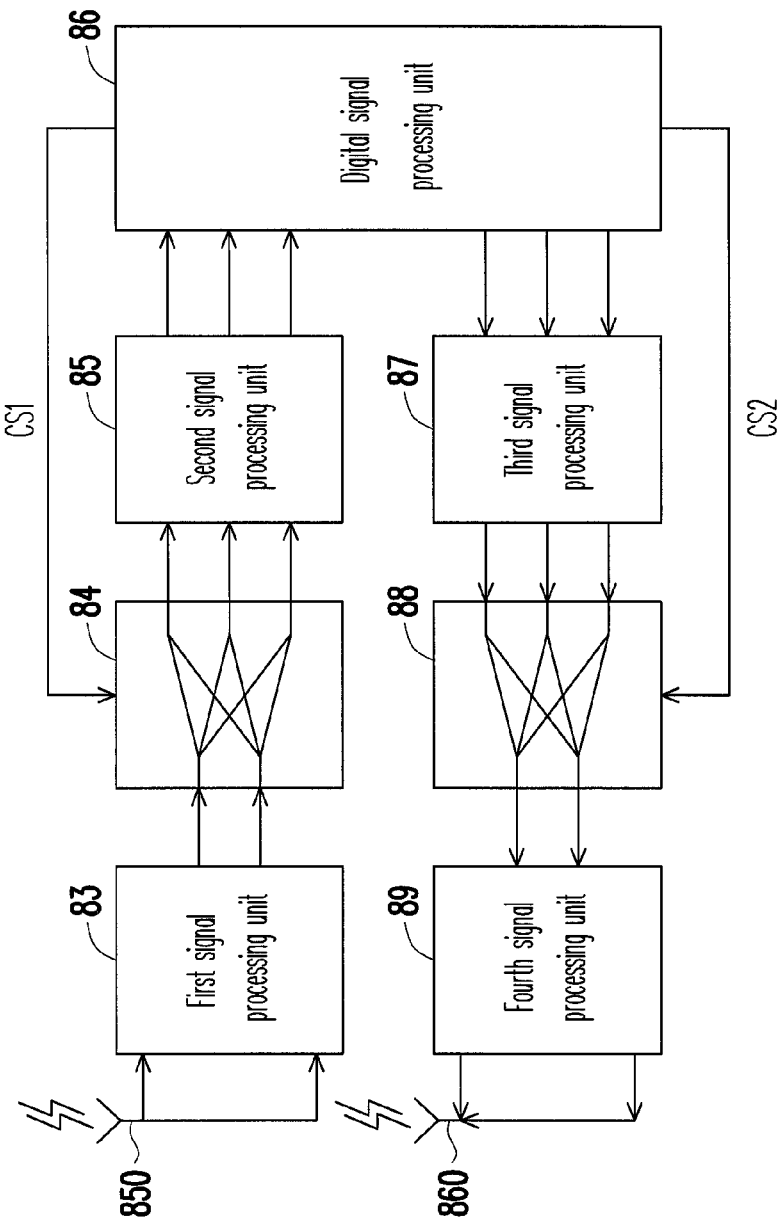
FIG. 8C is a system structural diagram illustrating a multi-carrier transceiver system according to an eleventh exemplary embodiment of the disclosure.

FIG. 8C is a system structural diagram illustrating a multi-carrier transceiver system 840 according to an eleventh exemplary embodiment of the disclosure. The multi-carrier transceiver system 840 is similar to the multi-carrier transceiver system 800, and a difference therebetween is that the multi-carrier transceiver system 840 just has one antenna 850 for receiving RF signals and one antenna 860 for transmitting the RF signals. The antenna 850 has a bandwidth equal to a total bandwidth of the antenna 81 and the antenna 82, and the antenna 860 has a bandwidth equal to a total bandwidth of the antenna 90 and the antenna 91.

In the present embodiment, the router 13 of FIG. 2 can have an implementation pattern different to that in FIG. 3A to FIG. 3C, which is implemented in a manner of first "splitting" and then "combining", or in another manner of first "combining" and then "splitting". The two implementations of the router will be introduced in accordance with FIG. 9 and FIG. 10 below.

Figure 9:
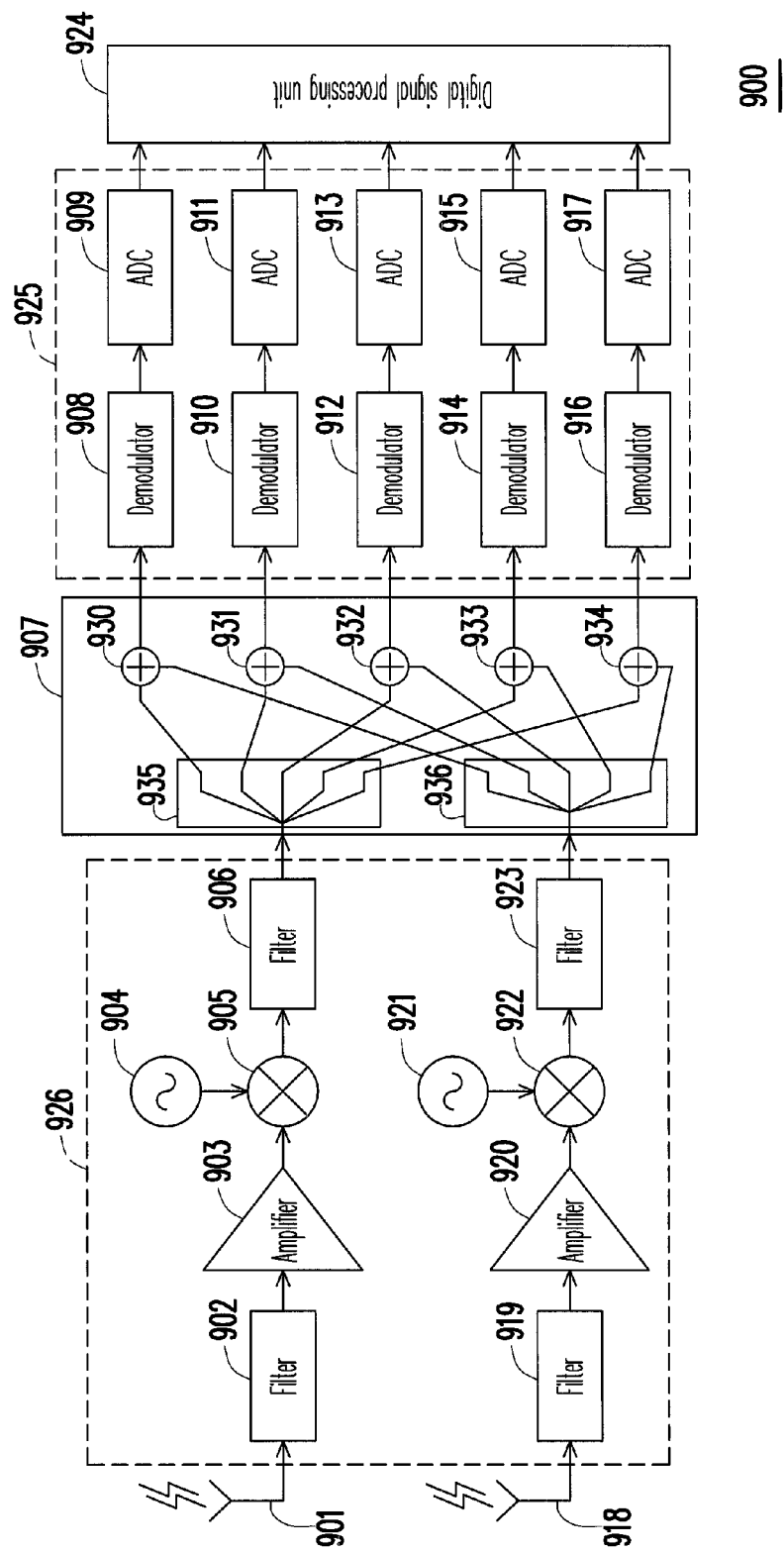
FIG. 9 is a system structural diagram illustrating a multi-carrier receiver according to a twelfth exemplary embodiment of the disclosure.

Referring to FIG. 9, FIG. 9 is a system structural diagram illustrating a multi-carrier receiver 900 according to a twelfth exemplary embodiment of the disclosure. The multi-carrier receiver 900 is similar to the multi-carrier receiver 300 of FIG. 3A, except that an implementation of a router 907 is different to that of the router 13 of FIG. 3A. The multi-carrier receiver 900 includes an antenna 901, an antenna 918, a first signal processing unit 926, the router 907, a second signal processing unit 925 and a digital signal processing unit 924.

Since processing methods of a filter 902, an amplifier 903, an oscillator 904, a mixer 905 and a filter 906 of a first signal processing path, and a filter 919, an amplifier 920, an oscillator 921, a mixer 922 and a filter 923 of a second signal processing path of the first signal processing unit 926 are respectively similar to the processing methods of the filter 302, the amplifier 303, the oscillator 304, the mixer 305 and the filter 306 of the first signal processing unit 14 of FIG. 3A, detailed technical descriptions thereof are not repeated herein.

Since processing methods of a demodulator 908 and an ADC 909 of the first signal processing path, a demodulator 910 and an ADC 911 of the second signal processing path, a demodulator 912 and an ADC 913 of the third signal processing path, a demodulator 914 and an ADC 915 of the fourth signal processing path, and a demodulator 916 and an ADC 917 of the fifth signal processing path of the second signal processing unit 925 are respectively similar to the processing methods of the demodulator 340 and the ADC 341 of the second signal processing unit 14 of FIG. 3A, detailed technical descriptions thereof are not repeated herein.

Since a processing method of the digital signal processing unit 924 is similar to that of the digital signal processing unit 15 of FIG. 3A, a detailed technical description thereof is not repeated herein.

The router 907 is implemented in a manner of first "splitting" and then "combining", which includes M power splitters and N diplexers. For example, in FIG. 9, each of the power splitters 935 and 936 has one input terminal and N output terminal, and the input terminal of each power splitter is coupled to one of M first signal processing paths (for example, the first and the second signal processing paths shown in FIG. 9). Moreover, each of the N diplexers 930, 931, 932, 933 and 934 has two input terminals and one output terminal, where the two input terminals of each diplexer are respectively coupled to any two of the M power splitters, and the output terminal of each diplexer is coupled to one of the N second signal processing paths (for example, the first to the fifth signal processing paths shown in FIG. 9). For example, the two input terminals of the diplexer 930 are respectively coupled to one of the output terminals of the power splitters 935 and 936, and the output terminal of the diplexer 930 is coupled to the first signal processing path of the second signal processing unit 925.

In the present exemplary embodiment, the router 907 can output one or a plurality of sub-carrier signals of M input terminals to N output terminals, and the received signal at each output terminal of the router 907 includes the sub-carrier signal at each input terminal. In other embodiments, a power combiner can be used to replace the diplexers 930, 931, 932, 933 and 934 of FIG. 9, which can achieve the same effects. Alternatively, in another embodiment, demultiplexers or diplexers can be used to replace the power splitter 935 and 936 of FIG. 9, which can achieve the same effects.

Figure 10:
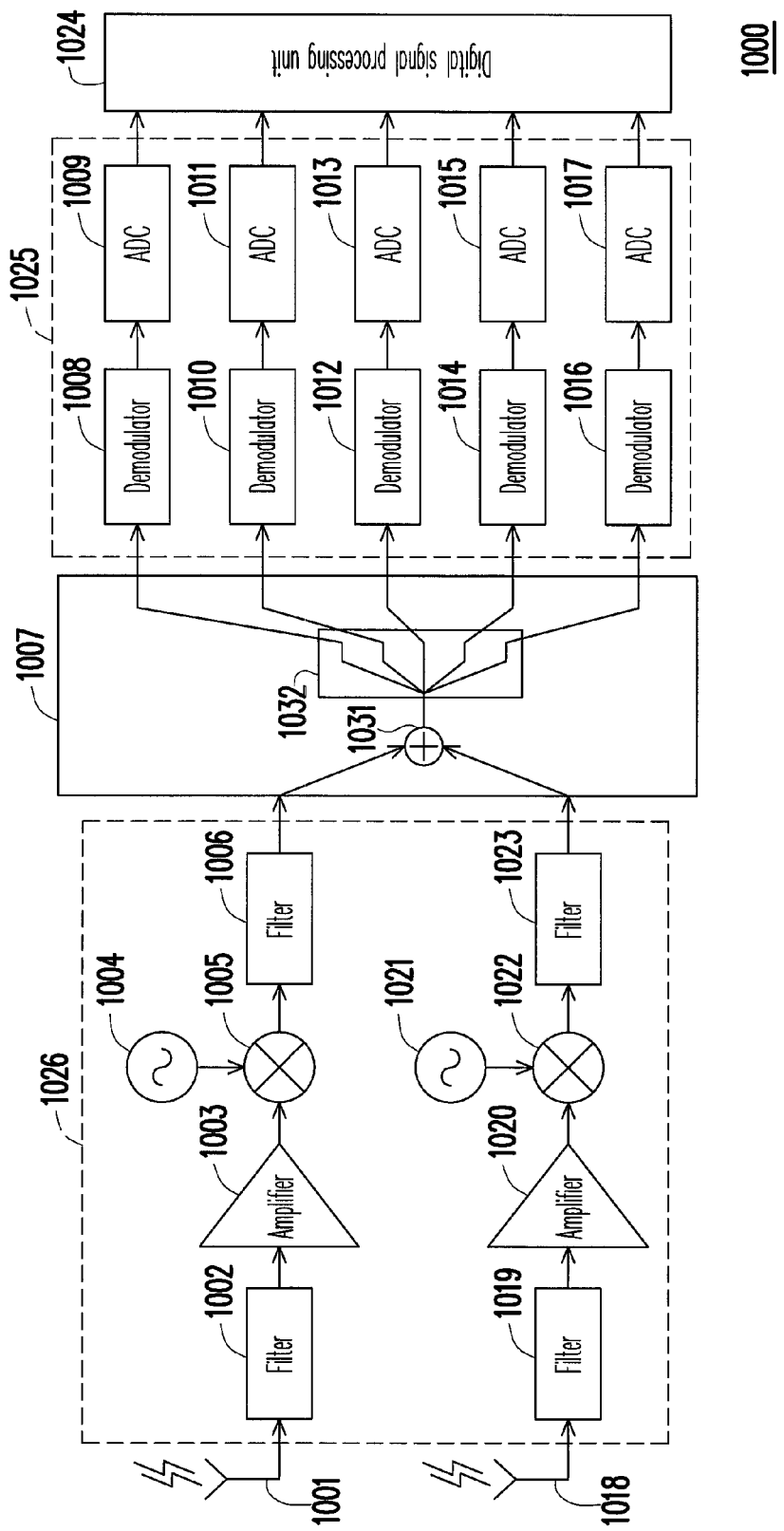
FIG. 10 is a system structural diagram illustrating a multi-carrier receiver according to a thirteenth exemplary embodiment of the disclosure.

FIG. 10 is a system structural diagram illustrating a multi-carrier receiver 1000 according to a thirteenth exemplary embodiment of the disclosure. The multi-carrier receiver 1000 is similar to the multi-carrier receiver 300 of FIG. 3A, except that an implementation of a router 1007 is different to that of the router 13 of FIG. 3A. The multi-carrier receiver 1000 includes an antenna 1001, an antenna 1018, a first signal processing unit 1026, the router 1007, a second signal processing unit 1025 and a digital signal processing unit 1024.

Since processing methods of a filter 1002, an amplifier 1003, an oscillator 1004, a mixer 1005 and a filter 1006 of a first signal processing path, and a filter 1019, an amplifier 1020, an oscillator 1021, a mixer 1022 and a filter 1023 of a second signal processing path of the first signal processing unit 1026 are respectively similar to the processing methods of the filter 302, the amplifier 303, the oscillator 304, the mixer 305 and the filter 306 of the first signal processing unit 14 of FIG. 3A, detailed technical descriptions thereof are not repeated herein.

Since processing methods of a demodulator 1008 and an ADC 1009 of the first signal processing path, a demodulator 1010 and an ADC 1011 of the second signal processing path, a demodulator 1012 and an ADC 1013 of the third signal processing path, a demodulator 1014 and an ADC 1015 of the fourth signal processing path, and a demodulator 1016 and an ADC 1017 of the fifth signal processing path of the second signal processing unit 1025 are respectively similar to the processing methods of the demodulator 340 and the ADC 341 of the second signal processing unit 14 of FIG. 3A, detailed technical descriptions thereof are not repeated herein.

Since a processing method of the digital signal processing unit 1024 is similar to that of the digital signal processing unit 15 of FIG. 3A, a detailed technical description thereof is not repeated herein.

The router 1007 is implemented in a manner of first "combining" and then "splitting", which includes one power combiner 1031 and one demultiplexer 1032. In FIG. 10, the power combiner 1031 has M input terminals and one output terminal, where the M input terminals of the power combiner 1031 are respectively coupled to M first signal processing paths of the first signal processing unit 1026. For example, as shown in FIG. 10, two input terminals of the power combiner 1031 are respectively coupled to a first signal processing path (i.e., one input terminal of the power combiner 1031 is coupled to the filter 1006) and a second signal processing path (i.e., another input terminal of the power combiner 1031 is coupled to the filter 1023) of the first signal processing unit 1026.

Moreover, the demultiplexer 1032 has one input terminal and N output terminals, where the input terminal of the demultiplexer 1032 is coupled to the output terminal of the power combiner 1031, and the N output terminals of the demultiplexer 1032 are respectively coupled to N second signal processing paths. For example, 5 output terminals of the demultiplexer 1032 are respectively coupled to a first to a fifth signal processing paths of the second signal processing unit 1025.

In the present exemplary embodiment, the router 1007 can output one or a plurality of sub-carrier signals of M input terminals to N output terminals, and the received signal at each output terminal of the router 1007 includes the sub-carrier signal at each input terminal. In other embodiments, a power splitter can be used to replace the demultiplexer of FIG. 10, which can achieve the same effects.

In the disclosure, the router 23 of FIG. 4 can have an implementation pattern different to that in FIG. 5A to FIG. 5C, which is implemented in a manner of first "splitting" and then "combining", or in another manner of first "combining" and then "splitting". The two implementations of the router will be introduced in accordance with FIG. 11 and FIG. 12 below.

Figure 11:
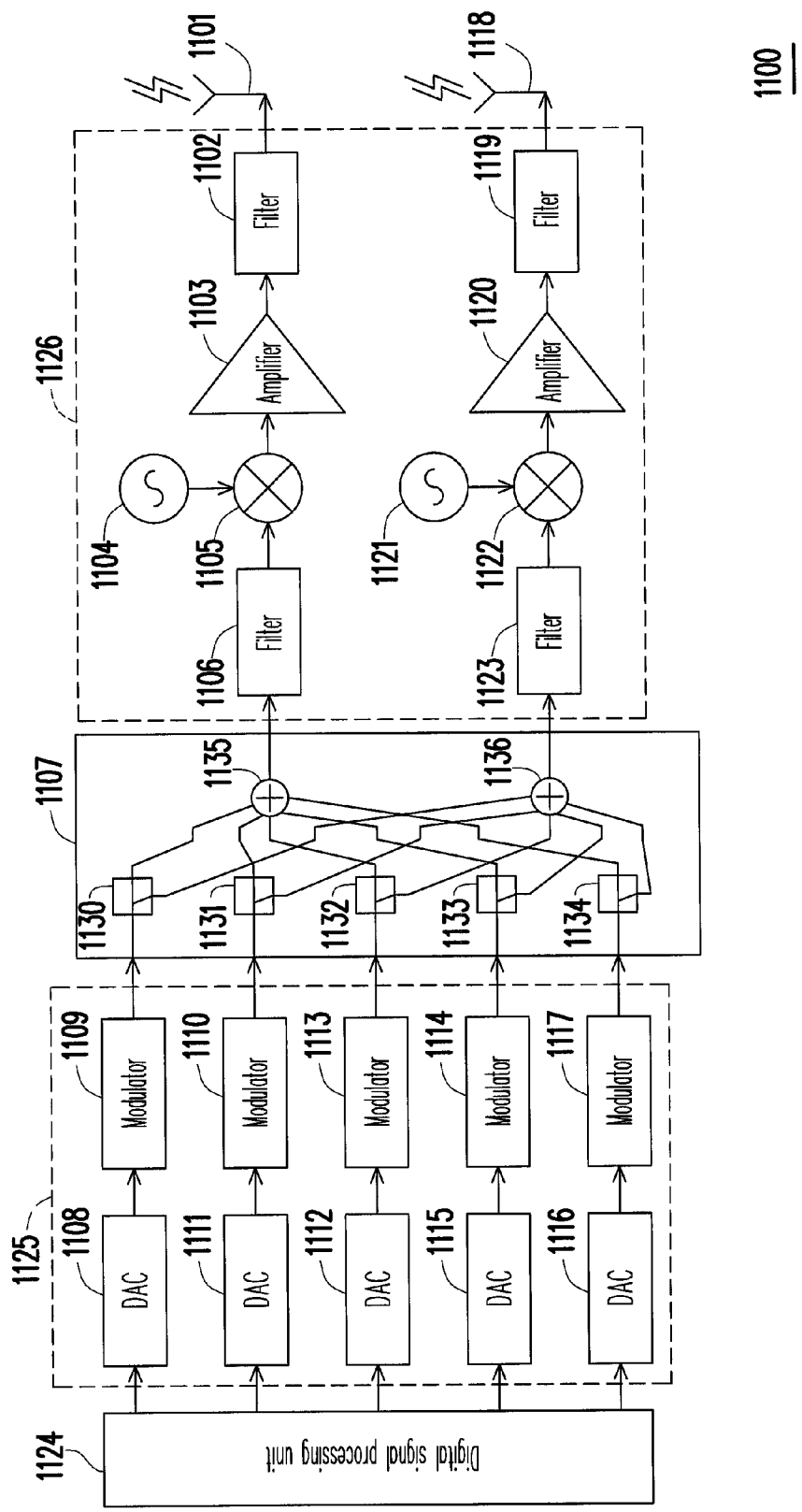
FIG. 11 is a system structural diagram illustrating a multi-carrier transmitter according to a fourteenth exemplary embodiment of the disclosure.

FIG. 11 is a system structural diagram illustrating a multi-carrier transmitter 1100 according to a fourteenth exemplary embodiment of the disclosure. The multi-carrier transmitter 1100 is similar to the multi-carrier transmitter 500 of FIG. 5A, except that an implementation of a router 1107 is different to that of the router 23 of FIG. 5A. The multi-carrier transmitter 1100 includes an antenna 1101, an antenna 1118, a third signal processing unit 1125, the router 1107, a fourth signal processing unit 1126 and a digital signal processing unit 1124.

Since processing methods of a DAC 1108 and a modulator 1109 of the first signal processing path, a DAC 1111 and a modulator 1110 of the second signal processing path, a DAC 1112 and a modulator 1113 of the third signal processing path, a DAC 1115 and a modulator 1114 of the fourth signal processing path, and a DAC 1116 and a modulator 1117 of the fifth signal processing path of the third signal processing unit 1125 are respectively similar to the processing methods of the DAC 540 and the modulator 541 of the third signal processing unit 24 of FIG. 5A, detailed technical descriptions thereof are not repeated herein.

Since processing methods of a filter 1106, an oscillator 1104, a mixer 1105, an amplifier 1103, and a filter 1102 of a first signal processing path, and a filter 1123, an oscillator 1121, a mixer 1122, an amplifier 1120, and a filter 1119 of a second signal processing path of the fourth signal processing unit 1126 are respectively similar to the processing methods of the filter 505, the oscillator 503, the mixer 504, the amplifier 502, and the filter 501 of the fourth signal processing unit 22 of FIG. 5A, detailed technical descriptions thereof are not repeated herein.

Since a processing method of the digital signal processing unit 1124 is similar to that of the digital signal processing unit 25 of FIG. 5A, a detailed technical description thereof is not repeated herein.

The router 1107 is implemented in a manner of first "splitting" and then "combining", which includes K diplexers and L combiners. As shown in FIG. 11, each of K diplexers 1130, 1131, 1132, 1133 and 1134 has one input terminal and two output terminals, where the input terminal of each diplexer is coupled to one of K signal processing paths of the third signal processing unit 1125. For example, the modulator 1109 of the first signal processing path of the third signal processing unit 1125 of FIG. 11 is coupled to the input terminal of the diplexer 1130.

Moreover, one of the L power combiners 1135 and 1136 has K input terminals and one output terminal, where the K input terminals of each of the power combiners 1135 and 1136 are respectively coupled to the K diplexers, and the output terminal of each power combiner is coupled to one of the L second signal processing paths (for example, the first and the second signal processing paths of the fourth signal processing unit 1126 shown in FIG. 11). For example, the output terminal of the power combiner 1135 is coupled to the filter 1106 of the first signal processing path of the fourth signal processing unit 1126, and the output terminal of the power combiner 1136 is coupled to the filter 1123 of the second signal processing path of the fourth signal processing unit 1126.

In the present exemplary embodiment, the router 1107 can output one or a plurality of sub-carrier signals of K input terminals to L output terminals, and the received signal at each output terminal of the router 1107 includes the sub-carrier signal at each input terminal. In other embodiments, a multiplexer can be used to replace the diplexers 1130, 1131, 1132, 1133 and 1134 of FIG. 11, which can achieve the same effects. Alternatively, in another embodiment, demultiplexers can be used to replace the power combiners 1135 and 1136 of FIG. 11, which can achieve the same effects.

Figure 12:
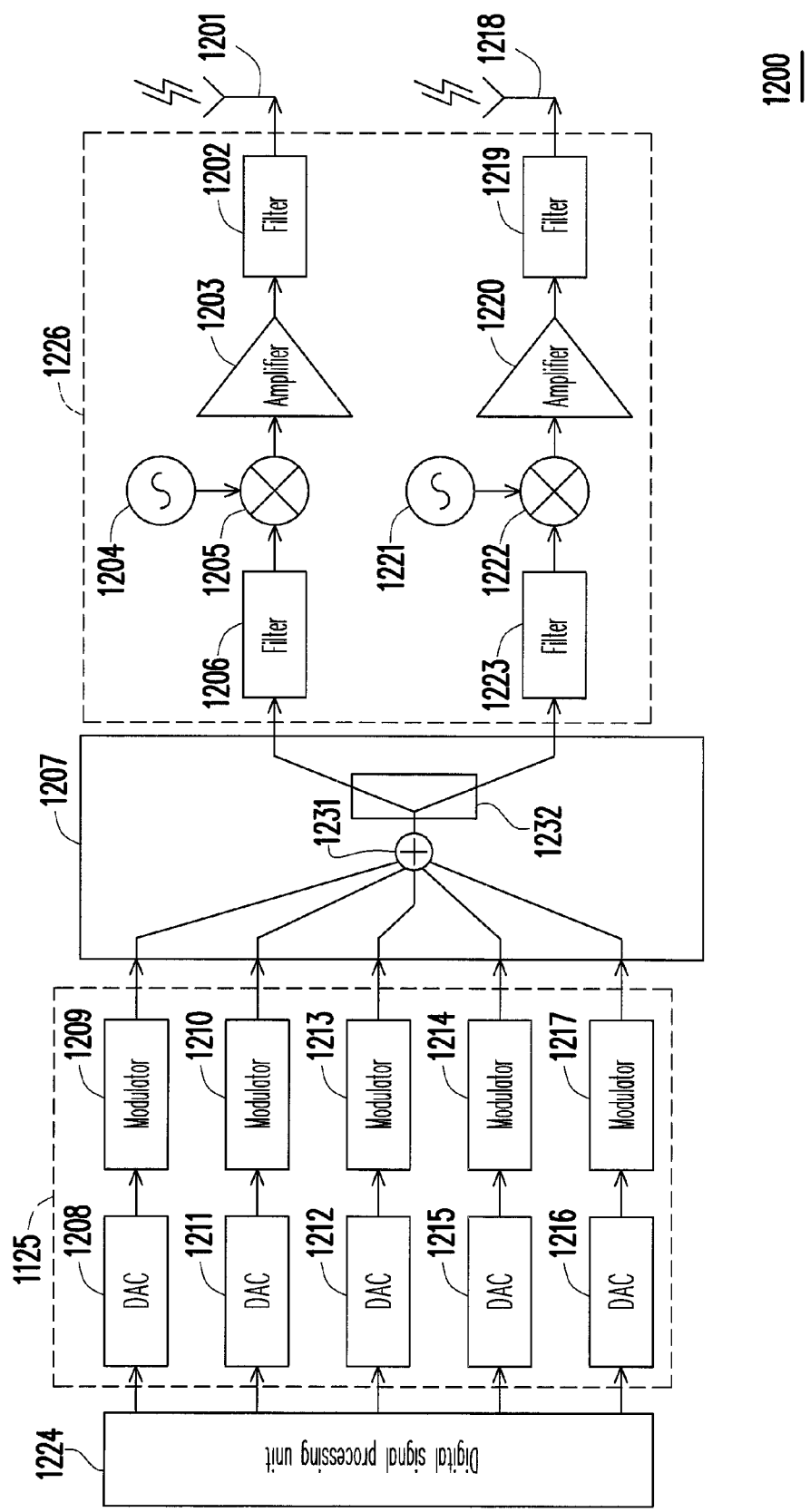
FIG. 12 is a system structural diagram illustrating a multi-carrier transmitter according to a fifteenth exemplary embodiment of the disclosure.

FIG. 12 is a system structural diagram illustrating a multi-carrier transmitter 1200 according to a fifteenth exemplary embodiment of the disclosure. The multi-carrier transmitter 1200 is similar to the multi-carrier transmitter 500 of FIG. 5A, except that an implementation of a router 1207 is different to that of the router 23 of FIG. 5A. The multi-carrier transmitter 1200 includes an antenna 1201, an antenna 1218, a third signal processing unit 1225, the router 1207, a fourth signal processing unit 1226 and a digital signal processing unit 1224.

Since processing methods of a DAC 1208 and a modulator 1209 of the first signal processing path, a DAC 1211 and a modulator 1210 of the second signal processing path, a DAC 1212 and a modulator 1213 of the third signal processing path, a DAC 1215 and a modulator 1214 of the fourth signal processing path, and a DAC 1216 and a modulator 1217 of the fifth signal processing path of the third signal processing unit 1225 are respectively similar to the processing methods of the DAC 540 and the modulator 541 of the third signal processing unit 24 of FIG. 5A, detailed technical descriptions thereof are not repeated herein.

Since processing methods of a filter 1206, an oscillator 1204, a mixer 1205, an amplifier 1203, and a filter 1202 of a first signal processing path, and a filter 1223, an oscillator 1221, a mixer 1222, an amplifier 1220, and a filter 1219 of a second signal processing path of the fourth signal processing unit 1226 are respectively similar to the processing methods of the filter 505, the oscillator 503, the mixer 504, the amplifier 502, and the filter 501 of the fourth signal processing unit 22 of FIG. 5A, detailed technical descriptions thereof are not repeated herein.

Since a processing method of the digital signal processing unit 1224 is similar to that of the digital signal processing unit 25 of FIG. 5A, a detailed technical description thereof is not repeated herein.

The router 1207 is implemented in a manner of first "combining" and then "splitting", which includes one power combiner 1231 and one power splitter 1232. As shown in FIG. 12, the power combiner 1231 has K input terminals and one output terminal, where the K input terminals of the power combiner 1231 are respectively coupled to K signal processing paths of the third signal processing unit 1225. For example, as shown in FIG. 12, the modulator 1209 of the first signal processing path of the third signal processing unit 1125 is coupled to one of the input terminals of the power combiner 1231. The output terminal of the power combiner 1231 is coupled to the input terminal of the power splitter 1232.

Moreover, the power splitter 1232 has one input terminal and L output terminals, where the L output terminals are respectively coupled to L signal processing paths (for example, the first and the second signal processing paths of the fourth signal processing unit 1126 shown in FIG. 12) of the fourth signal processing unit 1126. For example, one output terminal of the power splitter 1232 is coupled to the filter 1206 of the first signal processing path of the fourth signal processing unit 1226, and another output terminal of the power splitter 1232 is coupled to the filter 1223 of the second signal processing path of the fourth signal processing unit 1226.

In the present exemplary embodiment, the router 1207 can output one or a plurality of sub-carrier signals of K input terminals to L output terminals, and the received signal at each output terminal of the router 1207 includes the sub-carrier signal at each input terminal. In other embodiments, a multiplexer can be used to replace the power combiner 1231 of FIG. 12, which can achieve the same effects. Alternatively, in another embodiment, a demultiplexer can be used to replace the power splitter 1232 of FIG. 12, which can achieve the same effects.

In other embodiments, the routers 84 in the multi-carrier transceiver systems 800, 820 and 840 of FIG. 8A to FIG. 8C can all be implemented by the router 907 of FIG. 9 or the router 1007 of FIG. 10. Similarly, the routers 88 in FIG. 8A to FIG. 8C can all be implemented by the router 1107 of FIG. 11 or the router 1207 of FIG. 12.

The multi-carrier receivers, the multi carrier transmitters and the multi-carrier transceiver systems provided by the exemplary embodiments of the disclosure can be applied to a wireless communication device, and the wireless communication device is, for example, a digital television, a digital set-top box (STB), a desk-top computer, a notebook computer, a flat-panel computer, a mobile phone, a smart phone, an electronic book or a multimedia player.

In summary, the exemplary embodiments of the disclosure provide a multi-carrier receiver, a multi-carrier transmitter and a multi-carrier transceiver system. In the multi-carrier receiver or the multi-carrier transmitter, the signal processing units of two stages are used to process the RF signals and the sub-carrier signals therein. Moreover, between the signal processing units of the two stages, the router is used to dynamically allocate different sub-carrier signals to independent and parallel signal processing paths, so as to reduce bandwidth requirements of the parallel signal processing paths, and lower complexity and hardware cost of the multi-carrier receiver or the multi-carrier transmitter. Moreover, hardware idle rate and power consumption can also be reduced, and an effect of simultaneously processing multiple non-contiguous sub-carrier signals can be achieved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A multi-carrier receiver, comprising:
   a first signal processing unit, having M first signal processing paths, and configured for performing a first signal processing to at least a radio frequency (RF) signal for outputting at least a sub-carrier signal, wherein the at least a RF signal is the aggregation of at least a sub-carrier signal and is adjusted by a carrier aggregation technique dynamically, wherein the sub-carrier signals are non-contiguous, and M is greater than 1;

a router, having M input terminals and N output terminals, wherein the M input terminals are respectively coupled to the M first signal processing paths of the first signal processing unit for receiving the at least a sub-carrier signal, and are configured for selecting to output the at least a sub-carrier signal to the N output terminals, wherein the received signal at each of the N output terminals of the router comprises the sub-carrier signal at each of the M input terminals of the router, and N is greater than 1; and a second processing unit, having N second processing paths respectively coupled to the N output terminals of the router for performing a second signal processing to the at least a sub-carrier signal and outputting at least a digital signal.

2. The multi-carrier receiver as claimed in claim 1, further comprising:

at least an antenna, configured for receiving the at least a RF signal; and a digital signal processing unit, coupled to the second signal processing unit, configured for receiving the at least a digital signal, performing a digital signal processing to the at least a digital signal, and providing a control signal to the router, wherein the first signal processing unit further performs a filtering processing and a voltage enhancement processing to the at least a RF signal.

3. The multi-carrier receiver as claimed in claim 1, wherein each one of the first signal processing paths of the first signal processing unit comprises:

a first filter, configured for filtering noise of one of the at least a RF signal that is not belonging to a band of the first signal processing path;

an amplifier, coupled to the first filter, configured for enhancing one of the at least a RF signal;

an oscillator, configured for providing a frequency signal;

a mixer, coupled to the oscillator and the amplifier, configured for receiving the enhanced one of the at least a RF signal, down-converting a frequency of one of the at least a RF signal, and generating the at least a down-converted sub-carrier signal; and a second filter, coupled to the mixer, configured for filtering noise of the at least a sub-carrier signal that is not belonging to a down-converted intermediate frequency band.

4. The multi-carrier receiver as claimed in claim 3, wherein each one of the second signal processing paths of the second signal processing unit comprises:

a demodulator, for performing a demodulation processing to one of the at least a down-converted sub-carrier signal, and generating a demodulated analog signal; and an analog-to-digital converter, coupled to the demodulator, configured for performing an analog-to-digital conversion to the analog signal to generate one of the at least a digital signal.

5. The multi-carrier receiver as claimed in claim 4, further comprising:

at least an antenna, configured for receiving the a least a RF signal; and a digital signal processing unit, coupled to the second signal processing unit, configured for receiving the at least a digital signal, performing a digital signal processing to the at least a digital signal, and providing a control signal to the router.

6. The multi-carrier receiver as claimed in claim 1, wherein each first signal processing path of the first signal processing unit comprises:

a first filter, configured for filtering noise of one of the at least a RF signal that is not belonging to a band of the first signal processing path; and an amplifier, coupled to the first filter, configured for performing a signal intensity processing to one of the at least a RF signal.

7. The multi-carrier receiver as claimed in claim 6, wherein each one of the second signal processing paths of the second signal processing unit comprises:

a demodulator, configured for performing a demodulation processing to one of the at least a sub-carrier signal, and generating a demodulated analog signal; and an analog-to-digital converter, coupled to the demodulator, configured for performing an analog-to-digital conversion to the analog signal to generate one of the at least a digital signal.

8. The multi-carrier receiver as claimed in claim 7, further comprising:

at least an antenna, configured for receiving the a least a RF signal; and a digital signal processing unit, coupled to the second signal processing unit, configured for receiving the at least a digital signal, performing a digital signal processing to the at least a digital signal, and providing a control signal to the router.

9. The multi-carrier receiver as claimed in claim 1, wherein the router comprises:

M power splitters, each having one input terminal and N output terminals, wherein the input terminal of the power splitter is coupled to one of the M first signal processing paths; and N diplexers, each having two input terminals and an output terminal, wherein the two input terminals of each of the diplexers are respectively coupled to any two of the M power splitters, and the output terminal of each of the diplexers is coupled to one of the N second signal processing paths.

10. The multi-carrier receiver as claimed in claim 1, wherein the router comprises:

a power combiner, having M input terminals and one output terminal, wherein the M input terminals of the power combiner are respectively coupled to the M first signal processing paths; and a demultiplexer, having an input terminal and N output terminals, wherein the input terminal of the demultiplexer is coupled the output terminal of the power combiner, and the N output terminals of the demultiplexer are respectively coupled to the N second signal processing paths.

11. A multi-carrier transmitter, comprising:

a first signal processing unit, having K first signal processing paths, and configured for performing a first signal processing to at least a digital signal for outputting at least a sub-carrier signal, wherein the at least a digital signal is the aggregation of the at least a sub-carrier signal and is adjusted by a carrier aggregation technique dynamically, wherein the sub-carrier signals are non-contiguous, wherein K is greater than 1;

a router, having K input terminals and L output terminals, wherein the K input terminals are respectively coupled to the K first signal processing paths of the first signal processing unit for receiving the at least a sub-carrier signal, and configured for selecting to output the at least a sub-carrier signal to the L output terminals, wherein the received signal at each of the L output terminals of the router comprises the sub-carrier signal at each of the K input terminals of the router, and L is greater than 1; and a second signal processing unit, having L second signal processing paths respectively coupled to the L output terminals of the router, configured for performing a second signal processing to the at least a sub-carrier signal and outputting at least a radio frequency (RF) signal.

12. The multi-carrier transmitter as claimed in claim 11, further comprising:
a digital signal processing unit, coupled to the first signal processing unit, configured for providing the at least a digital signal to the first signal processing unit, and providing a control signal to the router; and
at least an antenna, for transmitting the at least a RF signal, wherein the at least a RF signal comprises the at least a sub-carrier signal,
wherein the second signal processing unit further performs a filtering processing and a voltage enhancement processing to the at least a sub-carrier signal.

13. The multi-carrier transmitter as claimed in claim 11, wherein each one of the first signal processing paths of the first signal processing unit comprises:
a digital-to-analog converter, coupled to the digital signal processing unit, configured for performing a digital-to-analog conversion to one of the at least a digital signal to generate an analog signal; and
a modulator, configured for performing a modulation processing to the analog signal, and generating one of the at least a modulated sub-carrier signal.

14. The multi-carrier transmitter as claimed in claim 13, wherein each one of the second signal processing paths of the second signal processing unit comprises:
a first filter, configured for filtering noise of the at least a sub-carrier signal that is not belonging to an intermediate frequency band of the second signal processing path;
an oscillator, configured for providing a frequency signal;
an amplifier, coupled to the first filter, configured for enhancing the at least a RF signal;
a mixer, coupled to the oscillator and the amplifier, configured for receiving the at least a filtered sub-carrier signal and the frequency signal, up-converting a frequency of the at least a sub-carrier signal, and generating the at least a frequency-increased RF signal; and
a second filter, coupled to the amplifier, configured for filtering noise of the at least a gained RF signal that is not belonging to a band of the second signal processing path.

15. The multi-carrier transmitter as claimed in claim 14, further comprising:
a digital signal processing unit, coupled to the first signal processing unit, configured for providing the at least a digital signal to the first signal processing unit, and providing a control signal to the router; and
at least an antenna, for transmitting the at least a RF signal, wherein the at least a RF signal comprises the at least a sub-carrier signal.

16. The multi-carrier transmitter as claimed in claim 13, wherein each of the second signal processing paths of the second signal processing unit comprises:
an amplifier, coupled to the first filter, configured for enhancing one of the at least a RF signal; and
a filter, coupled to the amplifier, configured for filtering noise of the at least a gained RF signal that is not belonging to a band of the second signal processing path.

17. The multi-carrier transmitter as claimed in claim 16, further comprising:

a digital signal processing unit, coupled to the first signal processing unit, configured for providing the at least a digital signal to the first signal processing unit, and providing a control signal to the router; and
at least an antenna, for transmitting the at least a RF signal, wherein the at least a RF signal comprises the at least a sub-carrier signal.

18. The multi-carrier transmitter as claimed in claim 16, wherein the router comprises:
K diplexers, each having an input terminal and two output terminals, wherein the input terminal of each of the diplexers is coupled to one of the K first signal processing paths; and
L power combiners, each having K input terminals and an output terminal, wherein the K input terminals of each of the power combiners are respectively coupled to the K diplexers, and the output terminal of each of the power combiners is coupled to one of the L second signal processing paths.

19. The multi-carrier transmitter as claimed in claim 16, wherein the router comprises:
a power combiner, having K input terminals and an output terminal, wherein the K input terminals of the power combiner are respectively coupled to the K first signal processing paths; and
a power splitter, having an input terminal and L output terminals, wherein the input terminal of the power splitter is coupled the output terminal of the power combiner, and the L output terminals of the power splitter are respectively coupled to the L second signal processing paths.

20. A multi-carrier transceiver system, comprising:
a multi-carrier receiver, comprising:
a first signal processing unit, having M first signal processing paths, and configured for performing a first signal processing to at least a first radio frequency (RF) signal for outputting at least a first sub-carrier signal, wherein the at least a first RF signal is the aggregation of at least a sub-carrier signal and is adjusted by a carrier aggregation technique dynamically, wherein the sub-carrier signals are non-contiguous, and M is greater than 1;
a first router, having M input terminals and N output terminals, wherein the M input terminals are respectively coupled to the M first signal processing paths of the first signal processing unit for receiving the at least a first sub-carrier signal, and are configured for selecting to output the at least a first sub-carrier signal to the N output terminals according to a first control signal, wherein the received signal at each of the N output terminal of the first router includes the sub-carrier signal at each of the M input terminals of the router, and N is greater than 1; and
a second signal processing unit, having N second signal processing paths respectively coupled to the N output terminals of the first router, configured for performing a second signal processing to the at least a first sub-carrier signal and outputting at least a first digital signal; and a multi-carrier transmitter, configured for transmitting at least a second sub-carrier signal.

21. The multi-carrier transceiver system as claimed in claim 20, wherein the multi-carrier receiver further comprises:
at least a first antenna, configured for receiving the at least a first RF signal, wherein the first signal processing unit further performs a filtering processing and a voltage enhancement processing to the at least a first RF signal.

22. The multi-carrier transceiver system as claimed in claim 20, wherein the second signal processing of the second signal processing unit comprises a demodulation processing and an analog-to-digital conversion.

23. The multi-carrier transceiver system as claimed in claim 20,
wherein the multi-carrier transmitter comprises:
- a third signal processing unit, having K third signal processing paths, and configured for performing a third signal processing to at least a second digital signal for outputting at least a second sub-carrier signal, wherein K is greater than 1;
- a second router, having K input terminals and L output terminals, wherein the K input terminals are respectively coupled to the K third signal processing paths of the third signal processing unit for receiving the at least a second sub-carrier signal, and selecting to output the at least a second sub-carrier signal to the L output terminals, wherein the received signal at each output terminal of the second router includes the sub-carrier signal at each input terminal, and L is greater than 1; and
- a fourth signal processing unit, having L fourth signal processing paths respectively coupled to the L output terminals of the second router, configured for performing a fourth signal processing to the at least a second sub-carrier signal and outputting at least a second RF signal, wherein the at least a second RF signal comprises the at least a second sub-carrier signal.

24. The multi-carrier transceiver system as claimed in claim 23, wherein the multi-carrier transmitter further comprises:
at least a second antenna, for transmitting the at least a second RF signal,
wherein the fourth signal processing unit further performs a filtering processing and a voltage enhancement processing to the at least a second sub-carrier signal.

25. The multi-carrier transceiver system as claimed in claim 23, wherein the third signal processing of the third signal processing unit comprises a digital-to-analog conversion and a modulation processing.

26. The multi-carrier transceiver system as claimed in claim 23, further comprising:
a digital signal processing unit, coupled to the second signal processing unit and the third signal processing unit, configured for receiving the at least a first digital signal, performing a digital signal processing to the at least a first digital signal, providing a first control signal to the first router, providing the at least a second digital signal to the third signal processing unit, and providing the second control signal to the second router.

27. A multi-carrier receiver, comprising:
a first signal processing unit, having M first signal processing paths, and configured for performing a first signal processing to at least a radio frequency (RF) signal for outputting at least a sub-carrier signal, wherein the at least a RF signal is the aggregation of at least a sub-carrier signal and is adjusted by a carrier aggregation technique dynamically, wherein the sub-carrier signals are non-contiguous and M is greater than 1;
a routed switch, having M input terminals and N output terminals, wherein the M input terminals are respectively coupled to the M first signal processing paths of the first signal processing unit for receiving the at least a sub-carrier signal, the routed switch dynamically switches the at least a sub-carrier signal to independent and parallel signal processing paths, and the routed switch selects to connect each input terminal to at least an output terminal or none of the output terminals according to a control signal, wherein N is greater than 1; and
a second signal processing unit, having N second signal processing paths respectively coupled to the N output terminals of the routed switch for performing a second signal processing to the at least a sub-carrier signal and outputting at least a digital signal.

28. A multi-carrier transmitter, comprising:
a first signal processing unit, having K first signal processing paths, and configured for performing a first signal processing to at least a digital signal for outputting at least a sub-carrier signal, wherein the at least a digital signal is the aggregation of the at least a sub-carrier signal and is adjusted by a carrier aggregation technique dynamically, wherein the sub-carrier signals are non-contiguous, wherein K is greater than 1;
a routed switch, having K input terminals and L output terminals, wherein the K input terminals are respectively coupled to the K first signal processing paths of the first signal processing unit for receiving the at least a sub-carrier signal, the routed switch dynamically switches the at least a sub-carrier signal to independent and parallel signal processing paths, and the routed switch selects to connect each input terminal to at least an output terminal or none of the output terminals according to a control signal, wherein L is greater than 1; and
a second signal processing unit, having L second signal processing paths respectively coupled to the L output terminals of the routed switch for performing a second signal processing to the at least a sub-carrier signal and outputting at least a RF signal.

29. A multi-carrier transceiver system, comprising:
a multi-carrier receiver, comprising:
a first signal processing unit, having M first signal processing paths, and configured for performing a first signal processing to at least a first radio frequency (RF) signal for outputting at least a first sub-carrier signal, wherein the at least a first RF signal is the aggregation of the at least a sub-carrier signal and is adjusted by a carrier aggregation technique dynamically, wherein the sub-carrier signals are non-contiguous, and M is greater than 1;
a first routed switch, having M input terminals and N output terminals, wherein the M input terminals are respectively coupled to the M first signal processing paths of the first signal processing unit for receiving the at least a first sub-carrier signal, the routed switch dynamically switches the at least a sub-carrier signal to independent and parallel signal processing paths, and the first routed switch selects to connect each input terminal of the first routed switch to at least an output terminal or none of the output terminals according to a first control signal, where N is greater than 1; and
a second signal processing unit, having N second signal processing paths respectively coupled to the N output terminals of the first routed switch for performing a second signal processing to the at least a first sub-carrier signal and outputting at least a first digital signal; and a multi-carrier transmitter, configured for transmitting at least a second sub-carrier signal.

30. The multi-carrier transceiver system as claimed in claim 29, wherein the multi-carrier transmitter comprises:
- a third signal processing unit, having K third signal processing paths, and configured for performing a third signal processing to at least a second digital signal for outputting at least a second sub-carrier signal, where K is greater than 1;
- a second routed switch, having K input terminals and; output terminals, wherein the K input terminals are respectively coupled to the K third signal processing paths of the third signal processing unit for receiving the at least a second sub-carrier signal, and the second routed switch selects to connect each input terminal of the second routed switch to at least an output terminal or none of the output terminals according to a second control signal, where L is greater than 1; and
- a fourth signal processing unit, having L fourth signal processing paths respectively coupled to the L output terminals of the second routed switch for performing a fourth signal processing to the at least a second sub-carrier signal and outputting at least a second RF signal, wherein the at least a second RF signal comprises the at least a second sub-carrier signal.

* * * * *